US009356271B2

(12) United States Patent
Ramasubramanian et al.

(10) Patent No.: US 9,356,271 B2
(45) Date of Patent: May 31, 2016

(54) IONICALLY PERMEABLE STRUCTURES FOR ENERGY STORAGE DEVICES

(75) Inventors: Murali Ramasubramanian, Fremont, CA (US); Robert Spotnitz, Pleasanton, CA (US); Nirav Shah, Pleasanton, CA (US); Ashok Lahiri, Cupertino, CA (US); Christopher Castledine, III, Sunnyvale, CA (US); James D. Wilcox, Pleasanton, CA (US); Michael J. Armstrong, Danville, CA (US); Robert A. Cole, San Jose, CA (US); Brian Brusca, Tracy, CA (US); Harold J. Rust, III, Alamo, CA (US); Ken S. Matsubayashi, Fremont, CA (US); Laurie J. Lauchlan, Saratoga, CA (US); Gunther A. Koblmiller, Oakley, CA (US)

(73) Assignee: ENOVIX CORPORATION, Fremont, CA (US)

( * ) Notice: Subject to any disclaimer, the term of this patent is extended or adjusted under 35 U.S.C. 154(b) by 0 days.

(21) Appl. No.: 13/510,070

(22) PCT Filed: Jan. 24, 2012

(86) PCT No.: PCT/US2012/022393
§ 371 (c)(1),
(2), (4) Date: May 16, 2012

(87) PCT Pub. No.: WO2013/112135
PCT Pub. Date: Aug. 1, 2013

(65) Prior Publication Data
US 2014/0335395 A1    Nov. 13, 2014

(51) Int. Cl.
*H01M 2/16*    (2006.01)
*H01M 4/13*    (2010.01)
(Continued)

(52) U.S. Cl.
CPC .............. *H01M 2/16* (2013.01); *H01M 2/1673* (2013.01); *H01M 4/13* (2013.01); *H01M 4/139* (2013.01);
(Continued)

(58) Field of Classification Search
CPC .................. H01M 4/747; H01M 4/75; H01M 4/665–4/668; H01M 4/386
See application file for complete search history.

(56) References Cited

U.S. PATENT DOCUMENTS 5,238,759 A * 8/1993 Plichta et al. ................. 429/316
5,387,479 A * 2/1995 Koksbang ............... H01M 4/13
                                                   427/122
(Continued)

FOREIGN PATENT DOCUMENTS

EP    0883199    12/1998
EP    1028476    8/2000
(Continued)

OTHER PUBLICATIONS
International Search Report, issued on Oct. 10, 2012, for PCT/US2012/022393, 4 pages.
(Continued)

*Primary Examiner* — Maria J Laios
*Assistant Examiner* — Robert S Carrico
(74) *Attorney, Agent, or Firm* — Bryan Cave LLP

(57) ABSTRACT

An electrochemical stack comprising carrier ions, an anode comprising an anode active material layer, a cathode comprising a cathode active material layer, a separator between the anode and the cathode comprising a porous dielectric material and a non-aqueous electrolyte, and an ionically permeable conductor layer located between the separator and an electrode active material layer.

28 Claims, 8 Drawing Sheets

(51) Int. Cl.

| | |
|---|---|
| *H01M 4/66* | (2006.01) |
| *H01M 4/70* | (2006.01) |
| *H01M 10/05* | (2010.01) |
| *H01M 4/139* | (2010.01) |
| *H01M 4/1395* | (2010.01) |
| *H01M 4/36* | (2006.01) |
| *H01M 10/0525* | (2010.01) |
| *H01M 10/0566* | (2010.01) |
| *H01M 10/058* | (2010.01) |
| *H01M 2/14* | (2006.01) |
| *H01M 4/04* | (2006.01) |
| *H01M 4/1391* | (2010.01) |
| *H01M 4/1393* | (2010.01) |
| *H01M 10/42* | (2006.01) |

(52) U.S. Cl.
CPC ............ *H01M 4/1395* (2013.01); *H01M 4/366* (2013.01); *H01M 4/66* (2013.01); *H01M 4/661* (2013.01); *H01M 4/70* (2013.01); *H01M 10/05* (2013.01); *H01M 10/058* (2013.01); *H01M 10/0525* (2013.01); *H01M 10/0566* (2013.01); *H01M 2/145* (2013.01); *H01M 2/1646* (2013.01); *H01M 2/1653* (2013.01); *H01M 4/0452* (2013.01); *H01M 4/0471* (2013.01); *H01M 4/1391* (2013.01); *H01M 4/1393* (2013.01); *H01M 2010/4292* (2013.01); *Y02E 60/122* (2013.01)

(56) References Cited

U.S. PATENT DOCUMENTS

| | | | |
|---|---|---|---|
| 6,090,505 | A | 7/2000 | Shimamura et al. |
| 6,235,427 | B1 | 5/2001 | Idota et al. |
| 6,287,371 | B1 | 9/2001 | Ota et al. |
| 6,525,391 | B1 | 2/2003 | Bertrand et al. |
| 6,791,737 | B2 | 9/2004 | Giron |
| 7,066,971 | B1 | 6/2006 | Carlson |
| 8,475,957 | B2 | 7/2013 | Ramasubramanian et al. |
| 2002/0013986 | A1 | 2/2002 | Ahn et al. |
| 2002/0074972 | A1 | 6/2002 | Narang et al. |
| 2003/0082446 | A1 | 5/2003 | Chiang et al. |
| 2004/0185336 | A1 | 9/2004 | Ito et al. |
| 2004/0214085 | A1* | 10/2004 | Sheem et al. ............. 429/218.1 |
| 2004/0234861 | A1 | 11/2004 | Kawase et al. |
| 2004/0241540 | A1 | 12/2004 | Tsutsumi et al. |
| 2005/0008939 | A1 | 1/2005 | Ota et al. |
| 2005/0026037 | A1 | 2/2005 | Riley et al. |
| 2005/0095503 | A1 | 5/2005 | Adachi et al. |
| 2005/0130383 | A1 | 6/2005 | Divakaruni et al. |
| 2005/0208379 | A1 | 9/2005 | Musha et al. |
| 2006/0057433 | A1 | 3/2006 | Ando et al. |
| 2006/0093871 | A1 | 5/2006 | Howard |
| 2007/0002523 | A1* | 1/2007 | Ando et al. ................... 361/503 |
| 2007/0031733 | A1 | 2/2007 | Kogetsu et al. |
| 2007/0059584 | A1 | 3/2007 | Nakano et al. |
| 2007/0097481 | A1 | 5/2007 | Burdis et al. |
| 2007/0243460 | A1 | 10/2007 | Carlson et al. |
| 2008/0003490 | A1 | 1/2008 | Christensen |
| 2008/0032170 | A1 | 2/2008 | Wainright et al. |
| 2008/0081256 | A1 | 4/2008 | Madou et al. |
| 2008/0081257 | A1 | 4/2008 | Yoshida et al. |
| 2009/0035664 | A1 | 2/2009 | Chiang et al. |
| 2009/0068567 | A1 | 3/2009 | Konishiike et al. |
| 2009/0117472 | A1 | 5/2009 | Iwamoto |
| 2009/0123847 | A1 | 5/2009 | Okada et al. |
| 2009/0263716 | A1 | 10/2009 | Ramasubramanian et al. |
| 2009/0303660 | A1 | 12/2009 | Nair et al. |
| 2010/0040951 | A1 | 2/2010 | Yamamoto et al. |
| 2010/0119939 | A1 | 5/2010 | Misumi et al. |
| 2010/0129718 | A1* | 5/2010 | Higuchi ................ H01M 4/134 429/231.95 |
| 2010/0209775 | A1 | 8/2010 | Kim |
| 2010/0285368 | A1 | 11/2010 | Yamamoto et al. |
| 2011/0014522 | A1 | 1/2011 | Visco et al. |
| 2011/0020701 | A1 | 1/2011 | Park et al. |
| 2011/0067228 | A1 | 3/2011 | Green |
| 2011/0111283 | A1 | 5/2011 | Rust, III et al. |
| 2011/0129732 | A1 | 6/2011 | Bachrach et al. |
| 2011/0171518 | A1 | 7/2011 | Dunn et al. |
| 2012/0176093 | A1 | 7/2012 | Ramasubramanian et al. |
| 2013/0143120 | A1 | 6/2013 | Ramasubramanian et al. |
| 2013/0189602 | A1 | 7/2013 | Lahiri et al. |

FOREIGN PATENT DOCUMENTS

| | | |
|---|---|---|
| EP | 1100134 | 5/2001 |
| EP | 1102340 | 5/2001 |
| JP | 2003323882 | 11/2003 |
| JP | 2006-286427 A | 10/2012 |
| KR | 20030044508 | 6/2003 |
| WO | 03105258 | 12/2003 |
| WO | 2008-089110 A1 | 7/2008 |
| WO | 2008089110 | 7/2008 |
| WO | 2009129490 | 10/2009 |
| WO | 2009140300 | 11/2009 |
| WO | 2010092059 | 8/2010 |

OTHER PUBLICATIONS

Long et al., Three-Dimensional Battery Architectures, Chemical Reviews, 2004, 4463-4492, 104.
Kasavajjula et al., Nano- and Bulk-Silicon-Based Insertion Anodes for Lithium-Ion Secondary Cells, Journal of Power Sources, 2007, 1003-1039, 163.
Arora et al., Battery Separators, Chemical Reviews, 2004, 4419-4462, 104.
Whitehead et al., Current Collectors for positive electrodes of lithium-based batteries, Journal of the Electrochemical Society, 2005, A5105-A2113, 152(11).
Golodnitsky et al., Advanced materials for the 3D microbattery, Journal of Power Sources, 2006, 153, 281-287.
Broussely et al., Li-ion batteries and portable power source prospects for the next 5-10 years, Journal of Power Sources, 136, 2004, 386-394.
Harraz et al., Immersion plating of nickel onto a porous silicon layer from fluoride solutions, Phys. Stat. Sol., 2003, 197(1): 51-56.
Harraz et al., Different behavior in immersion plating of nickel on porous silicon from acidic and and alkaline fluoride media, J. Elect. Soc., 2003, 150(5): C277-284.
Obrovac et al., Reversible cycling of crystalline silicon powder, J. Elect. Soc., 2007, 154(2): A103-A108.
Waidmann et al., Tuning nickel silicide properties using a lamp based RTA, a heat conduction based RTA or a furnace anneal, Microelectronic Engineering, 2006, 83, 2282-2286.
Xu et al., Theorectical studies of displacement disposition of nickel into porous silicon with ultrahigh aspect ration, Electrochimica Acta, 2006, 52, 3901-3909.
Xu et al., Nickel displacement deposition of porous silicon with ultrahigh aspect ratio, J. Elect. Soc., 2007, 154(3): 170-174.
Zhang et al., High aspect ration nickel structions fabricated by electrochemical replication of hydrofluoric acid etched silicon, Electrochemical and Solid-State Letters, 2006, 9(9): C150-C152.
European Patent Office; Extended European Search Report issued on Europe App. No. 12866772.2 on Oct. 8, 2015, 9 pages.

* cited by examiner

IONICALLY PERMEABLE STRUCTURES FOR ENERGY STORAGE DEVICES

CROSS REFERENCE TO RELATED APPLICATIONS

This application is a U.S. National Phase Application of International Application PCT Application No. PCT/US2012/022393 filed on 24 Jan. 2012. The disclosures of International Application PCT Application No. PCT/US2012/022393 are incorporated herein by reference.

FIELD OF THE INVENTION

The present invention generally relates to structures for use in energy storage devices, to energy storage devices incorporating such structures, and to methods for producing such structures and energy devices.

BACKGROUND OF THE INVENTION

Rocking chair or insertion secondary batteries are a type of energy storage device in which carrier ions, such as lithium, sodium or potassium ions, move between an anode electrode and a cathode electrode through an electrolyte. The secondary battery may comprise a single battery cell, or two more battery cells that have been electrically coupled to form the battery, with each battery cell comprising an anode electrode, a cathode electrode, and an electrolyte.

In rocking chair battery cells, both the anode and cathode comprise materials into which a carrier ion inserts and extracts. As a cell is discharged, carrier ions are extracted from the anode and inserted into the cathode. As a cell is charged, the reverse process occurs: the carrier ion is extracted from the cathode and inserted into the anode.

FIG. 1 shows a cross sectional view of an electrochemical stack of an existing energy storage device, such as a non-aqueous, lithium-ion battery. The electrochemical stack 1 includes a cathode current collector 2, on top of which a cathode layer 3 is assembled. This layer is covered by a microporous separator 4, over which an assembly of an anode current collector 5 and an anode layer 6 are placed. This stack is sometimes covered with another separator layer (not shown) above the anode current collector 5, rolled and stuffed into a can, and filled with a non-aqueous electrolyte to assemble a secondary battery.

The anode and cathode current collectors pool electric current from the respective active electrochemical electrodes and enables transfer of the current to the environment outside the battery. A portion of an anode current collector is in physical contact with the anode active material while a portion of a cathode current collector is in contact with the cathode active material. The current collectors do not participate in the electrochemical reaction and are therefore restricted to materials that are electrochemically stable in the respective electrochemical potential ranges for the anode and cathode.

In order for a current collector to bring current to the environment outside the battery, it is typically connected to a tab, a tag, a package feed-through or a housing feed-through, typically collectively referred to as contacts. One end of a contact is connected to one or more current collectors while the other end passes through the battery packaging for electrical connection to the environment outside the battery. The anode contact is connected to the anode current collectors and the cathode contact is connected to the cathode current collectors by welding, crimping, or ultrasonic bonding or is glued in place with an electrically conductive glue.

During a charging process, lithium leaves the cathode layer 3 and travels through the separator 4 as a lithium ion into the anode layer 6. Depending upon the anode material used, the lithium ion either intercalates (e.g., sits in a matrix of an anode material without forming an alloy) or forms an alloy. During a discharge process, the lithium leaves the anode layer 6, travels through the separator 4 and passes through to the cathode layer 3. The current conductors conduct electrons from the battery contacts (not shown) to the electrodes or vice versa.

Existing energy storage devices, such as batteries, fuel cells, and electrochemical capacitors, typically have two-dimensional laminar architectures (e.g., planar or spiral-wound laminates) as illustrated in FIG. 1 with a surface area of each laminate being roughly equal to its geometrical footprint (ignoring porosity and surface roughness).

Three-dimensional batteries have been proposed in the literature as ways to improve battery capacity and active material utilization. It has been proposed that a three-dimensional architecture may be used to provide higher surface area and higher energy as compared to a two dimensional, laminar battery architecture. There is a benefit to making a three-dimensional energy storage device due to the increased amount of energy that may be obtained out of a small geometric area. See, e.g., Rust et al., WO2008/089110 and Long et. al, "Three-Dimensional Battery Architectures," *Chemical Reviews*, (2004), 104, 4463-4492.

New anode and cathode materials have also been proposed as ways to improve the energy density, safety, charge/discharge rate, and cycle life of secondary batteries. Some of these new high capacity materials, such as silicon, aluminum, or tin anodes in lithium batteries have significant volume expansion that causes disintegration and exfoliation from its existing electronic current collector during lithium insertion and extraction. Silicon anodes, for example, have been proposed for use as a replacement for carbonaceous electrodes since silicon anodes have the capacity to provide significantly greater energy per unit volume of host material for lithium in lithium battery applications. See, e.g., Konishiike et al., U.S. Patent Publication No. 2009/0068567; Kasavajjula et al., "Nano- and Bulk-Silicon-Based Insertion Anodes for Lithium-Ion Secondary Cells," *Journal of Power Sources* 163 (2007) 1003-1039. The formation of lithium silicides when lithium is inserted into the anode results in a significant volume change which can lead to crack formation and pulverisation of the anode. As a result, capacity of the battery can be decreased as the battery is repeatedly discharged and charged.

Monolithic electrodes, i.e., electrodes comprising a mass of electrode material that retains its a shape without the use of a binder, have also been proposed as an alternative to improve performance (gravimetric and volumetric energy density, rates, etc) over particulate electrodes that have been molded or otherwise formed into a shape and depend upon a conductive agent or binder to retain the shape of an agglomerate of the particulate material. A monolithic anode, for example, may comprise a unitary mass of silicon (e.g., single crystal silicon, polycrystalline silicon, amorphous silicon or a combination thereof) or it may comprise an agglomerated particulate mass that has been sintered or otherwise treated to fuse the anodic material together and remove any binder. In one such exemplary embodiment, a silicon wafer may be employed as a monolithic anode material for a lithium-ion battery with one side of the wafer coupled to a first cathode element through a separator, while the other side is coupled to a second cathode element opposing it. In such arrangements, one of the significant technical challenges is the ability to collect and carry current from the monolithic electrode to the outside of the battery while efficiently utilizing the space available inside the battery.

The energy density of conventional batteries may also be increased by reducing inactive component weights and volumes to pack the battery more efficiently. Current batteries use relatively thick current collectors since the foils that make up the current collectors are used with a minimum thickness requirement in order to be strong enough to survive the active material application process. Advantages in performance can be anticipated if an invention was made in order to separate the current collection from processing constraints.

Despite the varied approaches, a need remains for improved battery capacity and active material utilization.

SUMMARY OF THE INVENTION

Among the various aspects of the present invention is the provision of ionically permeable, electrically conductive structures, referred to herein as ionically permeable conductor layers or more simply as an IPC or IPC layer, for use in energy storage devices such as batteries, fuel cells, and electrochemical capacitors. In certain embodiments, for example, such layers may more uniformly distribute electrical current across the surface of the electrode active material, reduce the inactive component weights and volumes of batteries and other energy storage devices to pack the devices more efficiently, enable the thickness of the electrical contact system to be tailored without being limited by processing conditions, and/or provide other significant advantages when used in combination with particulate electrodes (i.e., composites of a particulate electrode active material and a conductive agent or other binder that have been molded or otherwise formed into a shape and depend upon the conductive agent or other binder to retain their shape) and monolithic electrodes during battery operation.

Briefly, therefore, one aspect of the present invention is an electrochemical stack comprising carrier ions, an anode comprising an anode active material layer, a cathode comprising a cathode active material layer, a separator between the anode and the cathode comprising a porous dielectric material and a non-aqueous electrolyte, and an ionically permeable conductor layer located between the separator and an electrode active material layer, the electrode active material being the anode active material layer or the cathode active material layer. Upon application of a current to store energy in the electrochemical stack or an applied load to discharge the electrochemical stack: (i) the carrier ions travel between the anode and cathode active material layers and through the ionically permeable conductor layer and separator as they travel between the anode active and cathode active material layers, (ii) the anode active material layer, the cathode active material layer, and the ionically permeable conductor layer each have an electrical conductance, (iii) the anode active material layer, the cathode active material layer, the ionically permeable conductor layer and the separator each have an ionic conductance for the carrier ions, (iv) the ratio of the ionic conductance of the ionically permeable conductor layer to the ionic conductance of the separator is at least 0.5:1, (v) the ratio of the electrical conductance of the ionically permeable conductor layer to the the electrical conductance of the electrode active material layer is at least 100:1, and (vi) the ratio of the electrical conductance to the ionic conductance of the ionically permeable conductor layer is at least 1,000:1.

Another aspect of the present invention is an energy storage device. The energy storage device, such as a secondary battery comprises an electrochemical stack comprising carrier ions, an anode comprising an anode active material layer, a cathode comprising a cathode active material layer, a separator between the anode and the cathode comprising a porous dielectric material and a non-aqueous electrolyte, and an ionically permeable conductor layer located between the separator and an electrode active material layer, the electrode active material being the anode active material layer or the cathode active material layer. Upon application of a current to store energy in the electrochemical stack or an applied load to discharge the electrochemical stack: (i) the carrier ions travel between the anode and cathode active material layers and through the ionically permeable conductor layer and separator as they travel between the anode active and cathode active material layers, (ii) the anode active material layer, the cathode active material layer, and the ionically permeable conductor layer each have an electrical conductance, (iii) the anode active material layer, the cathode active material layer, the ionically permeable conductor layer and the separator each have an ionic conductance for the carrier ions, (iv) the ratio of the ionic conductance of the ionically permeable conductor layer to the ionic conductance of the separator is at least 0.5:1, (v) the ratio of the electrical conductance of the ionically permeable conductor layer to the the electrical conductance of the electrode active material layer is at least 100:1, and (vi) the ratio of the electrical conductance to the ionic conductance of the ionically permeable conductor layer is at least 1,000:1.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENTS

Figure 1:
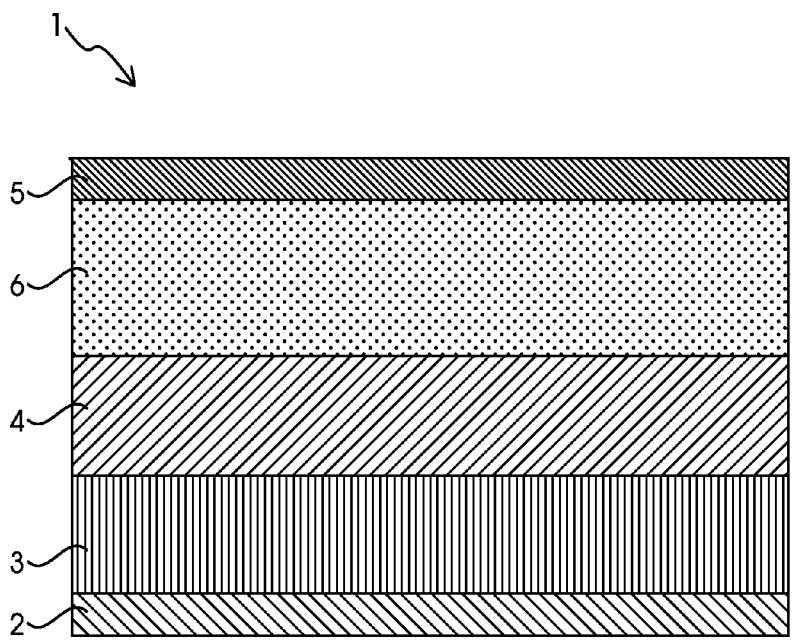
FIG. 1 is a generic cross-section of an electrochemical stack of an existing two-dimensional energy storage device such as a lithium ion battery.

Among the various aspects of the present invention may be noted ionically permeable conductor layers offering particular advantages when incorporated into electrochemical stacks used in energy storage devices such as batteries, capacitors, and fuel cells. The ionically permeable conductor layer may be positioned, for example, between the separator and the anodically active material layer in an electrochemical stack of an energy storage device such as a secondary battery, between the separator and the cathodically active material layer in an electrochemical stack of an energy storage device such as a secondary battery, or between the separator and the anodically active material layer and between the separator and the cathodically active material layer in an electrochemical stack of an energy storage device such as a secondary battery. As carrier ions move between the anodically active material and the cathodically active material in an electrochemical stack, therefore, they pass through an ionically permeable conductor layer positioned between the separator and the anodically active material layer, through an ionically permeable conductor layer positioned between the separator and the cathodically active material layer, or they pass through two ionically permeable conductor layers, one positioned between the separator and the anodically active material layer and the other positioned between the separator and the cathodically active material layer. Depending upon the materials of construction of the ionically permeable conductor layer, it may have some capacity to absorb and release a carrier ion such as lithium; in general, however, it is preferred that this capacity be relatively limited.

Advantageously, when an ionically permeable conductor layer is on the surface of the active material of an electrode and between the electrode and a separator, the ionically permeable conductor layer may facilitate more uniform carrier ion transport by distributing current from the current collector across the surface of the electrode facing the separator. This, in turn, may facilitate more uniform insertion and extraction of carrier ions and thereby reduce stress in the active electrode material (i.e., the anodically active material and/or the cathodically active material) during cycling; since the ionically permeable conductor distributes current to the surface of the electrode facing the separator, the reactivity of the electrode material for carrier ions will be the greatest where the carrier ion concentration is the greatest.

The ionically permeable conductor layer preferably has sufficient electrical conductance to enable it to serve as a current collector. In one embodiment, for example, an ionically permeable conductor layer is sandwiched between an immediately adjacent anode material layer and an immediately adjacent separator layer of an electrochemical stack, and is the anode current collector for that anode material layer. By way of further example, in another embodiment, an ionically permeable conductor layer is sandwiched between an immediately adjacent cathode material layer and an immediately adjacent separator layer of an electrochemical stack, and is the cathode current collector for that cathode material layer. By way of further example, in another embodiment, an electrochemical stack comprises at least two ionically permeable conductor layers (i) one of the two being sandwiched between an immediately adjacent anode material layer and an immediately adjacent separator layer and being the anode current collector layer for the immediately adjacent anode material layer, and (ii) the other of the two being sandwiched between an immediately adjacent cathode material layer and an immediately adjacent separator layer and being the cathode current collector layer for the immediately adjacent cathode material layer.

In general, the ionically permeable conductor layer is both ionically and electrically conductive. Stated differently, the ionically permeable conductor layer has a thickness, an electrical conductivity, and an ionic conductivity for carrier ions that facilitates the movement of carrier ions between an immediately adjacent active electrode material layer one side of the ionically permeable conductor layer and an immediately adjacent separator layer on the other side of the ionically permeable conductor layer in an electrochemical stack. On a relative basis, the ionically permeable conductor layer has an electrical conductance that is greater than its ionic conductance upon application of a current to store energy in the electrochemical stack or an applied load to discharge the electrochemical stack. For example, the ratio of the electrical conductance to the ionic conductance (for carrier ions) of the ionically permeable conductor layer will typically be at least 1,000:1, respectively, upon application of a current to store energy in the device or an applied load to discharge the device. By way of further example, in one such embodiment, the ratio of the electrical conductance to the ionic conductance (for carrier ions) of the ionically permeable conductor layer is at least 5,000:1, respectively, upon application of a current to store energy in the device or an applied load to discharge the device. By way of further example, in one such embodiment, the ratio of the electrical conductance to the ionic conductance (for carrier ions) of the ionically permeable conductor layer is at least 10,000:1, respectively, upon application of a current to store energy in the device or an applied load to discharge the device. By way of further example, in one such embodiment, the ratio of the electrical conductance to the ionic conductance (for carrier ions) of the ionically permeable conductor layer is at least 50,000:1, respectively, upon application of a current to store energy in the device or an applied load to discharge the device. By way of further example, in one such embodiment, the ratio of the electrical conductance to the ionic conductance (for carrier ions) of the ionically permeable conductor layer is at least 100,000:1, respectively, upon application of a current to store energy in the device or an applied load to discharge the device.

Upon application of a current to store energy in an electrochemical stack or an applied load to discharge the electrochemical stack of an energy storage device, such as when a secondary battery is charging or discharging, the ionically permeable conductor layer has an ionic conductance that is comparable to the ionic conductance of an adjacent separator layer. For example, in one embodiment the ionically permeable conductor layer has an ionic conductance (for carrier ions) that is at least 50% of the ionic conductance of the separator layer (i.e., a ratio of 0.5:1, respectively) upon application of a current to store energy in the device or an applied load to discharge the device. By way of further example, in some embodiments the ratio of the ionic conductance (for carrier ions) of the ionically permeable conductor layer to the ionic conductance (for carrier ions) of the separator layer is at least 1:1 upon application of a current to store energy in the device or an applied load to discharge the device. By way of further example, in some embodiments the ratio of the ionic conductance (for carrier ions) of the ionically permeable conductor layer to the ionic conductance (for carrier ions) of the separator layer is at least 1.25:1 upon application of a current to store energy in the device or an applied load to discharge the device. By way of further example, in some embodiments the ratio of the ionic conductance (for carrier ions) of the ionically permeable conductor layer to the ionic conductance (for carrier ions) of the separator layer is at least 1.5:1 upon application of a current to store energy in the device or an applied load to discharge the device. By way of further example, in some embodiments the ratio of the ionic conductance (for carrier ions) of the ionically permeable conductor layer to the ionic conductance (for carrier ions) of the separator layer is at least 2:1 upon application of a current to store energy in the device or an applied load to discharge the device.

The ionically permeable conductor layer also has an electrical conductance that is substantially greater than the electrical conductance of an adjacent electrode active material (La, the anodically active material or the cathodically active material). For example, in one embodiment the ratio of the electrical conductance of the ionically permeable conductor layer to the electrical conductance of the electrode active material layer is at least 100:1 upon application of a current to store energy in the electrochemical stack of an energy storage device or an applied load to discharge the electrochemical stack of an energy storage device. By way of further example, in some embodiments the ratio of the electrical conductance of the ionically permeable conductor layer to the electrical conductance of the electrode active material layer is at least 500:1 upon application of a current to store energy in the device or an applied load to discharge the device. By way of further example, in some embodiments the ratio of the electrical conductance of the ionically permeable conductor layer to the electrical conductance of the electrode active material layer is at least 1000:1 upon application of a current to store energy in the device or an applied load to discharge the device. By way of further example, in some embodiments the ratio of the electrical conductance of the ionically permeable conductor layer to the electrical conductance of the electrode active material layer is at least 5000:1 upon application of a current to store energy in the device or an applied load to discharge the device. By way of further example, in some embodiments the ratio of the electrical conductance of the ionically permeable conductor layer to the electrical conductance of the electrode active material layer is at least 10,000:1 upon application of a current to store energy in the device or an applied load to discharge the device.

The thickness of ionically permeable conductor layer (i.e., the shortest distance between the separator and the electrode active material between which the ionically permeable conductor layer is sandwiched) will depend upon the composition of the layer and the performance specifications for the electrochemical stack. In general, an ionically permeable conductor layer will have a thickness of at least about 300 Angstroms. For example, in some embodiments it may have a thickness in the range of about 300-800 Angstroms. More typically, however, it will have a thickness greater than about 0.1 micrometers. In general, an ionically permeable conductor layer will have a thickness not greater than about 100 micrometers. Thus, for example, in one embodiment, the ionically permeable conductor layer will have a thickness in the range of about 0.1 to about 10 micrometers. By way of further example, in some embodiments, the ionically permeable conductor layer will have a thickness in the range of about 0.1 to about 5 micrometers. By way of further example, in some embodiments, the ionically permeable conductor layer will have a thickness in the range of about 0.5 to about 3 micrometers. In general, it is preferred that the thickness of the ionically permeable conductor layer be approximately uniform. For example, in one embodiment it is preferred that the ionically permeable conductor layer have a thickness non-uniformity of less than about 25% wherein thickness non-uniformity is defined as the quantity of the maximum thickness of the layer minus the minimum thickness of the layer, divided by the average layer thickness. In certain embodiments, the thickness variation is even less. For example, in some embodiments the ionically permeable conductor layer has a thickness non-uniformity of less than about 20%. By way of further example, in some embodiments the ionically permeable conductor layer has a thickness non-uniformity of less than about 15%. in some embodiments the ionically permeable conductor layer has a thickness non-uniformity of less than about 10%.

In one preferred embodiment, the ionically permeable conductor layer comprises an electrically conductive component and an ion conductive component that contribute to the ionic permeability and electrical conductivity. Typically, the electrically conductive component will comprise a continuous electrically conductive material (such as a continuous metal or metal alloy) in the form of a mesh or patterned surface, a film, or composite material comprising the continuous electrically conductive material (such as a continuous metal or metal alloy). Additionally, the ion conductive component will typically comprise pores, e.g., interstices of a mesh, spaces between a patterned metal or metal alloy containing material layer, pores in a metal film, or a solid ion conductor having sufficient diffusivity for carrier ions. In certain embodiments, the ionically permeable conductor layer comprises a deposited porous material, an ion-transporting material, an ion-reactive material, a composite material, or a physically porous material. If porous, for example, the ionically permeable conductor layer may have a void fraction of at least about 0.25. In general, however, the void fraction will typically not exceed about 0.95. More typically, when the ionically permeable conductor layer is porous the void fraction may be in the range of about 0.25 to about 0.85. In some embodiments, for example, when the ionically permeable conductor layer is porous the void fraction may be in the range of about 0.35 to about 0.65

Figure 2:
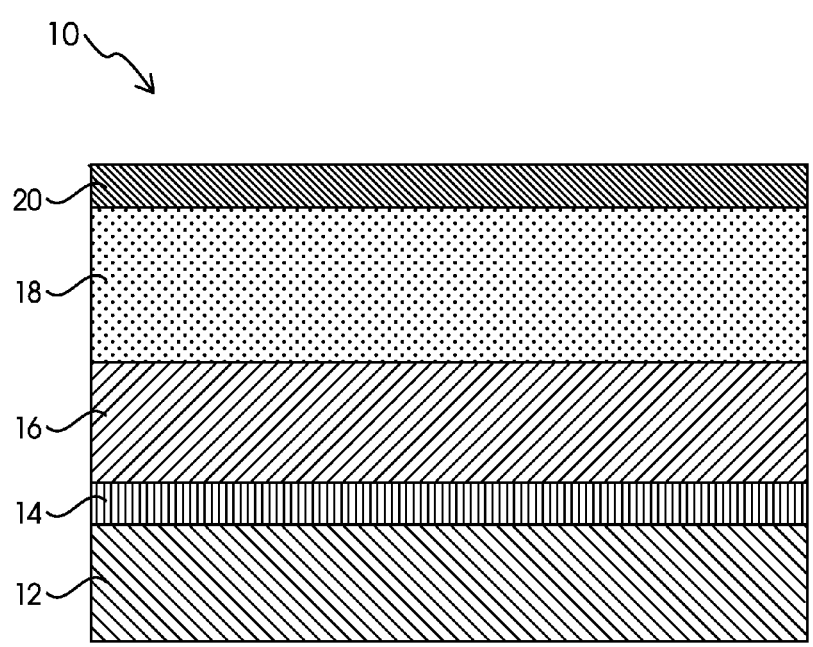
FIG. 2 is a schematic sectional view of an electrochemical stack of an energy storage device according to a first exemplary embodiment of the present invention.

Referring now to FIG. 2, in one embodiment an electrochemical stack 10 of the present invention has anodically active material layer 12, ionically permeable conductor layer 14, separator layer 16, cathodically active material layer 18 and cathode current collector layer 20.

Anodically active material layer 12 may comprise an anodically active material capable of absorbing and releasing a carrier ion such as lithium, potassium or sodium. Such materials include carbon materials such as graphite and soft or hard carbons, or any of a range of metals, semi-metals, alloys, oxides and compounds capable of forming an alloy with lithium. Specific examples of the metals or semi-metals capable of constituting the anode material include tin, lead, magnesium, aluminum, boron, gallium, silicon, indium, zirconium, germanium, bismuth, cadmium, antimony, silver, zinc, arsenic, hafnium, yttrium, and palladium. In one exemplary embodiment, anodically active material layer 12 comprises aluminum, tin, or silicon, or an oxide thereof, a nitride thereof, a fluoride thereof, or other alloy thereof. In another exemplary embodiment, anodically active material layer 12 comprises silicon or an alloy thereof. In each of the embodiments and examples recited in this paragraph, the anodically active material layer may be monolithic or a particulate agglomerate.

Ionically permeable conductor layer 14 allows both ionic and electronic conduction and, in a preferred embodiment, ionically permeable conductor layer also serves as the current collector for the anodically active material layer 12. In one such preferred embodiment, ionically permeable conductor layer is the sole anode current collector for anodically active material layer 12. Additionally, or alternatively, in one such preferred embodiment the ionically permeable conductor layer has an electrical conductivity that exceeds the electrical conductivity of the anodically active material layer or any layer in contact with the anodically active material layer (other than another ionically permeable conductor layer on a surface of the anodically active material layer). In general, therefore, it is preferred that the ratio of the ionic conductance (for the carrier ions) of ionically permeable conductor layer 14 to the ionic conductance (for the carrier ions) of separator layer 16 be at least 0.5:1 and in some embodiments at least 1:1, at least 1.25:1 or even 1.5:1, respectively, upon application of a current to store energy in the device or an applied load to discharge the device. In addition, it is generally preferred that the ratio of the electrical conductance of ionically permeable conductor layer 14 to the electrical conductance of anodically active material layer 12 be at least 100:1 and in some embodiments at least 500:1, at least 1,000:1, at least 5:000:1 or even 10,000:1, respectively, upon application of a current to store energy in the device or an applied load to discharge the device. It is also generally preferred that the ratio of the electrical conductance of ionically permeable conductor layer 14 to the ionic conductance (for carrier ions, e.g., lithium ions) of ionically permeable conductor layer 14 be at least 1,000:1 and in some embodiments at least 5,000:1, at least 10,000:1, at least 50,000:1 or even at least 100,000:1, respectively, upon application of a current to store energy in the device or an applied load to discharge the device.

Separator layer 16 is positioned between ionically permeable conductor layer 14 and cathodically active material layer 18. Separator layer 16 may comprise any of the materials conventionally used as secondary battery separators including, for example, microporous polyethylenes, polypropylenes, $TiO_2$, $SiO_2$, $Al_2O_3$, and the like (P. Arora and J. Zhang, "Battery Separators" Chemical Reviews 2004, 104, 4419-4462). Such materials may be deposited, for example, by electrophoretic deposition of a particulate separator material, slurry deposition (including spin or spray coating) of a particulate separator material, or sputter coating of an ionically conductive particulate separator material. Separator layer 38 may have, for example, a thickness (the distance separating an adjacent anodic structure and an adjacent cathodic structure) of about 5 to 100 micrometers and a void fraction of about 0.25 to about 0.75.

In operation, the separator may be permeated with a non-aqueous electrolyte containing any non-aqueous electrolyte that is conventionally used for non-aqueous electrolyte secondary batteries. Typically, the non-aqueous electrolyte comprises a lithium salt dissolved in an organic solvent. Exemplary lithium salts include inorganic lithium salts such as $LiClO_4$, $LiBF_4$, $LiPF_6$, $LiAsF_6$, $LiCl$, and $LiBr$; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$. Exemplary organic solvents to dissolve the lithium salt include cyclic esters, chain esters, cyclic ethers, and chain ethers. Specific examples of the cyclic esters include propylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

Cathodically active material layer 18 comprises any of a range of cathode active materials conventionally used in secondary batteries and other energy storage devices, including mixtures of cathode active materials. For example, a cathode material such as $LiCoO_2$, $LiNi_{0.5}Mn_{1.5}O_4$, $Li(Ni_xCo_yAl_2)O_2$, $LiFePO_4$, $Li_2MnO_4$, $V_2O_5$, and molybdenum oxysulfides are typically used for a lithium-ion battery. The cathode active material be deposited to form the cathode structure by any of a range of techniques including, for example, electrophoretic deposition, electrodeposition, co-deposition or slurry deposition. In one exemplary embodiment, one of the aforementioned cathode active materials, or a combination thereof, in particulate form is electrophoretically deposited. In another exemplary embodiment, a cathode active material such as $V_2O_5$ is electrodeposited. In another exemplary embodiment, one of the aforementioned cathode active materials, or a combination thereof, in particulate form is co-deposited in a conductive matrix such as polyaniline. In another exemplary embodiment, one of the aforementioned cathode active materials, or a combination thereof, in particulate form is slurry deposited. Independent of the method of deposition, the cathode active material layer will typically have a thickness between 1 micron and 1 mm. In certain embodiments, the layer thickness is between 5 microns and 200 microns, and in certain embodiments, the layer thickness is between 10 microns and 150 microns.

Cathode current collector layer 20 may comprise any of a range of metals conventionally used for current collectors. For example, in one embodiment, cathode current collector layer 20 comprises aluminum, carbon, chromium, gold, nickel, NiP, palladium, platinum, rhodium, ruthenium, an alloy of silicon and nickel, titanium, or an alloy of one or more thereof (see "Current collectors for positive electrodes of lithium-based batteries" by A. H. Whitehead and M. Schreiber, Journal of the Electrochemical Society, 152(11) A5105-A2113 (2005)). By way of further example, in one embodiment, cathode current collector layer 20 comprises gold or an alloy thereof such as gold silicide. By way of further example, in one embodiment, cathode current collector layer 20 comprises nickel or an alloy thereof such as nickel silicide.

In an alternative embodiment, the positions of the cathode current collector layer and the cathode active material layer are reversed relative to their positions as depicted in FIG. 2. Stated differently, in some embodiments, the cathode current collector layer is positioned between the separator layer and the cathodically active material layer. In such embodiments, the cathode current collector for the immediately adjacent cathodically active material layer is also an ionically permeable conductor layer. In one such embodiment, the ionically permeable conductor (cathode current collector) layer is the sole cathode current collector for the cathodically active material layer. Additionally, or alternatively, in one such preferred embodiment the ionically permeable conductor (cathode current collector) layer has an electrical conductivity that exceeds the electrical conductivity of the cathodically active material layer or any layer in contact with the cathodically active material layer (other than another ionically permeable conductor layer on a surface of the cathodically active material layer).

Figure 3:
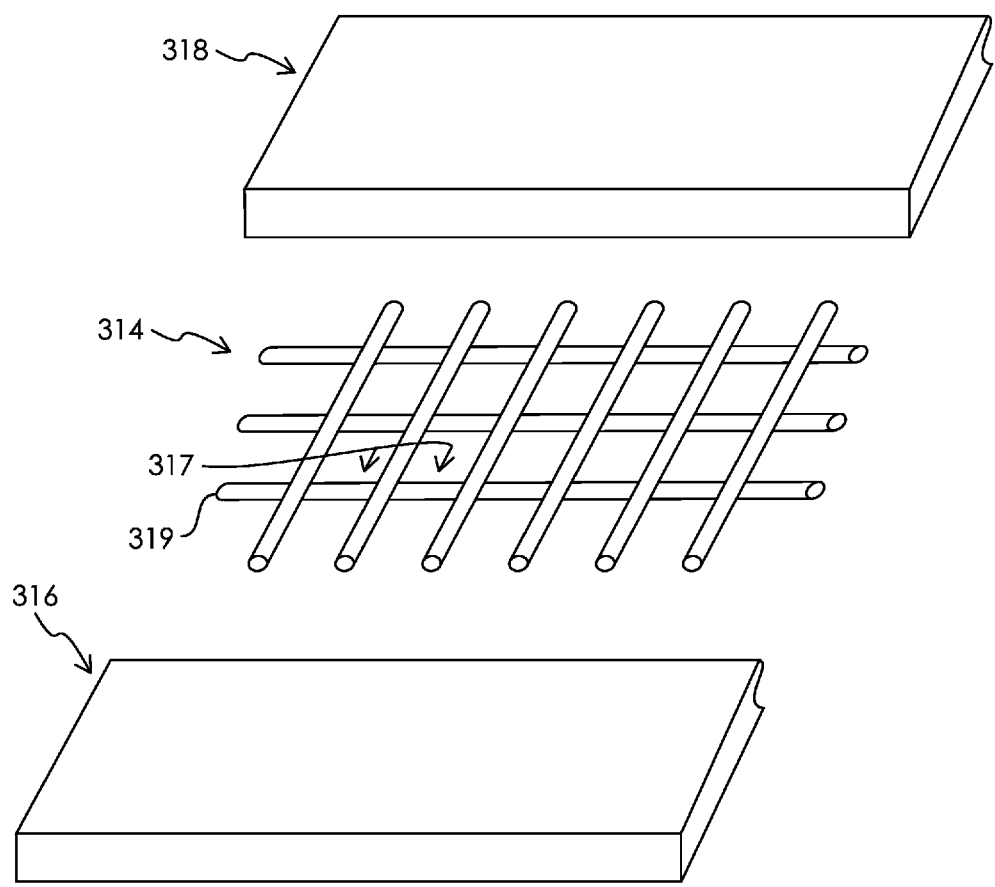
FIG. 3 is a schematic exploded view of a portion of an electrochemical stack of an energy storage device according to an alternative embodiment of the present invention.

Referring now to FIG. 3, in one embodiment, the ionically permeable conductor layer comprises a mesh 314 positioned between a separator layer 316 and an electrode active material layer 318. The mesh has interstices 317 defined by mesh strands 319 of an electrically conductive material. For example, when electrode active material layer 318 is an anodically active material layer, the mesh may comprise strands 319 of carbon, cobalt, chromium, copper, nickel, titanium, or an alloy of one or more thereof. By way of further example, when electrode active material layer 318 is a cathodically active material layer, the mesh may comprise strands 319 of aluminum, carbon, chromium, gold, NiP, palladium, rhodium, ruthenium, titanium, or an alloy of one or more thereof. In general, the mesh will have a thickness (i.e., the strands of the mesh have a diameter) of at least about 2 micrometers. In one exemplary embodiment, the mesh has a thickness of at least about 4 micrometers. In another exemplary embodiment, the mesh has a thickness of at least about 6 micrometers. In another exemplary embodiment, the mesh has a thickness of at least about 8 micrometers. In each of the foregoing embodiments, the open area fraction of the mesh (i.e., the fraction of the mesh constituting the interstices 317 between mesh strands 319) is preferably at least 0.5. For example, in each of the foregoing embodiments, the open area fraction of the mesh may be at least 0.6. By way of further example, in each of the foregoing embodiments, the open area fraction of the mesh may be at least 0.75. By way of further example, in each of the foregoing embodiments, the open area fraction of the mesh may be at least 0.8. In general, however, in each of the foregoing embodiments, the ratio of the average distance between the strands of the mesh to the thickness of the electrode active material layer is no more than 100:1, respectively. For example, in each of the foregoing embodiments, the ratio of the average distance between the mesh strands to the thickness of the electrode active material layer is no more than 50:1, respectively. By way of further example, in each of the foregoing embodiments, the ratio of the average distance between the mesh strands to the thickness of the electrode active material layer is no more than 25:1. Advantageously, one or both ends of the mesh may be welded or otherwise connected to metal tabs or other connectors to enable collected current to be carried to the environment outside the battery. As illustrated in FIG. 3, the mesh comprises two sets of parallel strands with one of sets being oriented perpendicularly and at a different elevation than the other set; in other embodiments, all of the strands of the mesh are substantially coplanar.

In those embodiments in which the ionically permeable conductor layer comprises a mesh of a metal or an alloy thereof as previously described, the interstices between the strands of the mesh may be open, they may be filled with a porous material that may be permeated with electrolyte, or they may contain a nonporous material through which the carrier ions may diffuse. When filled with a porous material, the porous material will typically have a void fraction of at least about 0.5, and in some embodiments, the void fraction will be at least 0.6, 0.7 or even at least about 0.8. Exemplary porous materials include agglomerates of a particulate ceramic such as $SiO_2$, $Al_2O_3$, SiC, or $Si_3N_4$ and agglomerates of a particulate polymer such as polyethylene, polypropylene, polymethylmethacrylates and copolymers thereof. Exemplary nonporous materials that may be placed in the interstices of the mesh include solid ion conductors such as $Na_3Zr_2Si_2PO_{12}$ (NASICON), $Li_{2+2x}Zn_{1-x}GeO_4$ (LISICON), and lithium phosphorous oxynitride (LiPON).

Figure 4:
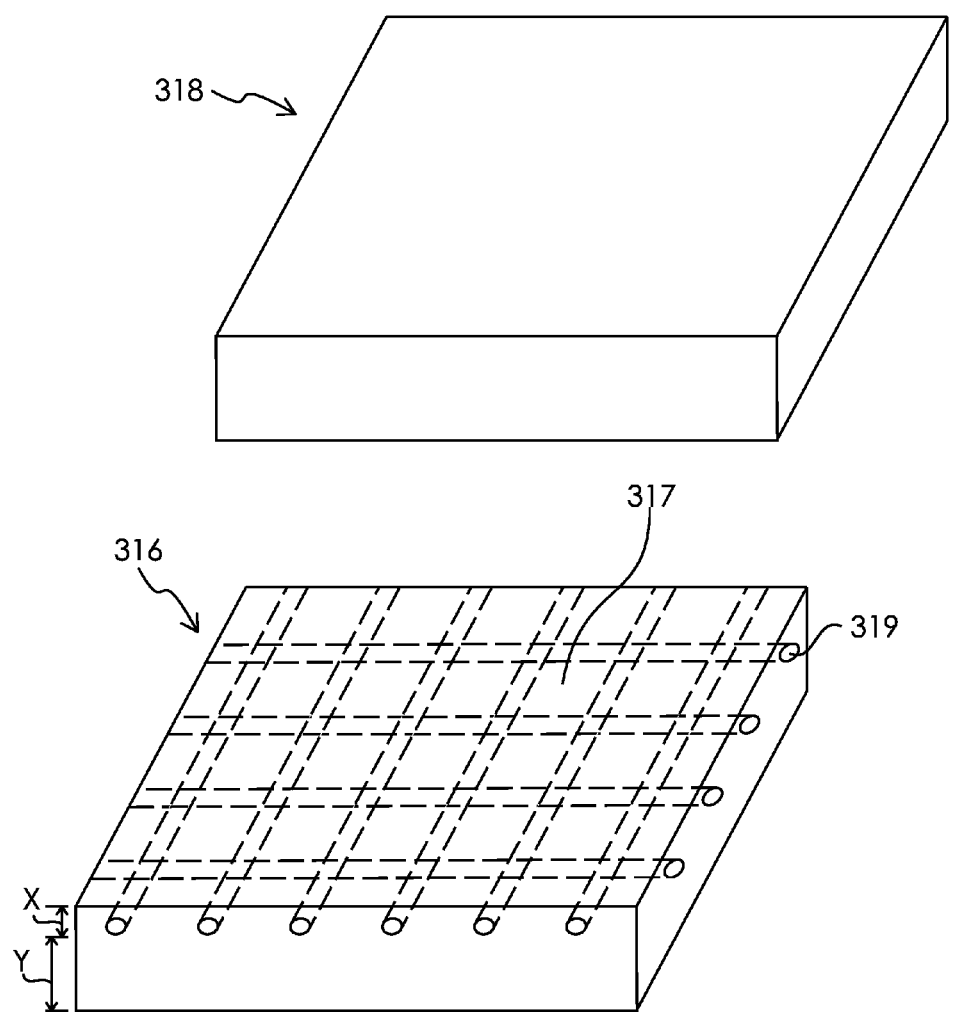
FIG. 4 is a schematic exploded view of a portion of an electrochemical stack of an energy storage device according to an alternative embodiment of the present invention.

Referring now to FIG. 4, in one alternative embodiment, the ionically permeable conductor layer comprises a mesh 314 of an electrically conductive material pressed into the separator material. For example, when electrode active material layer 318 is an anodically active material layer, the mesh may comprise strands 319 of carbon, cobalt, chromium, copper, nickel, titanium, or an alloy of one or more thereof. By way of further example, when electrode active material layer 318 is a cathodically active material layer, the mesh may comprise strands 319 of aluminum, carbon, chromium, gold, NiP, palladium, rhodium, ruthenium, titanium, or an alloy of one or more thereof. In such embodiments, the ionically permeable conductor layer will mesh will have a thickness (i.e., the strands of the mesh have a diameter), an open area fraction (i.e., the interstices between the mesh fibers), a ratio of the average distance between the strands of the mesh to the thickness of the electrode active material layer as previously described for meshes. In this embodiment, however, interstices 11 will contain separator material, the ionically permeable conductor layer will have a thickness X corresponding to the depth to which the mesh is pressed into the separator material and separator layer 316 will have thickness Y. For example, in such embodiments the ionically permeable conductor may have a thickness X of about 1 to about 100 micrometers and separator layer 316 will have thickness Y of about 1 to about 100 micrometers.

In one embodiment, the ionically permeable conductor layer comprises conductive lines deposited or otherwise formed on the surface of separator layer or the electrode active material layer. In such embodiments, the conductive lines may comprises any of the metals (or alloys thereof) previously identified in connection with the mesh component. For example, when the ionically permeable conductor layer is positioned between a separator layer and an anodically active material layer, the conductive lines may comprise carbon, cobalt, chromium, copper, nickel, titanium, or an alloy of one or more thereof. When the ionically permeable conductor layer is positioned between a separator layer and a cathodically active material layer, the conductive lines may comprise aluminum, carbon, chromium, gold, NiP, palladium, rhodium, ruthenium, an alloy of silicon and nickel, titanium, or an alloy of one or more thereof. In general, the conductive lines will have a thickness of at least about 2 micrometers. In one exemplary embodiment, the conductive lines have a thickness of at least about 4 micrometers. In another exemplary embodiment, the conductive lines have a thickness of at least about 6 micrometers. In another exemplary embodiment, the conductive lines have a thickness of at least about 8 micrometers. In each of the foregoing embodiments, the ratio of the average distance between the conductive lines to the thickness of the electrode active material layer is no more than 100:1, respectively. For example, in each of the foregoing embodiments, the ratio of the average distance between the conductive lines to the thickness of the electrode active material layer is no more than 50:1, respectively. By way of further example, in each of the foregoing embodiments, the ratio of the average distance between the conductive lines to the thickness of the electrode active material layer is no more than 25:1, respectively. Advantageously, one or more ends of the conductive lines may be welded or otherwise connected to metal tabs or other connectors to enable collected current to be carried to the environment outside the battery.

In those embodiments in which the ionically permeable conductor layer comprises a conductive line of a metal or an alloy thereof as previously described, the spaces on the surface of the coated material may be open, they may be filled with a porous material that may be permeated with electrolyte, or they may contain a nonporous material through which the carrier ions may diffuse. When filled with a porous material, the porous material will typically have a void fraction of at least about 0.5, and in some embodiments, the void fraction will be at least 0.6, 0.7 or even at least about 0.8. Exemplary porous materials include agglomerates of a particulate ceramic such as $SiO_2$, $Al_2O_3$, SiC, or $Si_3N_4$ and agglomerates of a particulate polymer such as polyethylene, polypropylene, polymethylmethacrylates and copolymers thereof. Exemplary nonporous materials that may be placed between the conductive lines include solid ion conductors such as Na$_3$Zr$_2$Si$_2$PO$_{12}$ (NASICON), Li$_{2+2x}$Zn$_{1-x}$GeO$_4$ (LISICON), and lithium phosphorous oxynitride (LiPON).

In one alternative embodiment, the ionically permeable conductor layer comprises a porous layer or film such as a porous metal layer. For example when electrode active material layer is an anodically active material layer, the porous layer may comprise a porous layer of carbon, cobalt, chromium, copper, nickel, titanium, or an alloy of one or more thereof. By way of further example, when electrode active material layer is a cathodically active material layer, the porous layer may comprise a porous layer of aluminum, carbon, chromium, gold, NiP, palladium, rhodium, ruthenium, titanium, or an alloy of one or more thereof. Exemplary deposition techniques for the formation of such porous layers include electroless deposition, electro deposition, vacuum deposition techniques such as sputtering, displacement plating. vapor deposition techniques such as chemical vapor deposition and physical vapor deposition, co-deposition followed by selective etching, and slurry coating of metal particles with a binder. In general, it is preferred that the void fraction of such porous layers be at least 0.25. For example, in one embodiment the void fraction of a porous metal layer will be at least 0.4, at least 0.5, at least 0.6, at least 0.7 and up to about 0.75. To provide the desired electrical conductance, the layer will typically have a thickness of at least about 1 micrometer. In some embodiments, the layer will have a thickness of at least 2 micrometers. In some embodiments, the layer will have a thickness of at least 5 micrometers. In general, however, the layer will typically have a thickness that does not exceed 20 micrometers, and more typically does not exceed about 10 micrometers. Optionally, such metal layers or films may contain a binder such as polyvinylidene fluoride (PVDF) or other polymeric or ceramic material.

In yet another alternative embodiment, the ionically permeable conductor layer comprises a metal-filled ion conducting polymer composite film. For example, the ionically permeable conductor layer may comprise an ionically conducting film such as polyethylene oxide or gel polymer electrolytes containing a conductive element such as aluminum, carbon, gold, titanium, rhodium, palladium, chromium, NiP, an alloy of silicon and nickel, or ruthenium, or an alloy thereof. Typically, however, solid ion conductors have relatively low ionic conductivity and, thus, the layers need to be relatively thin to provide the desired ionic conductance. For example, such layers may have a thickness in the range of about 0.5 to about 10 micrometers.

Referring again to FIG. 2, in one embodiment, ionically permeable conductor layer 14 comprises a porous layer of a metal or a metal alloy, preferably one which does not form an intermetallic compound with lithium. In this embodiment, for example, ionically permeable conductor layer 14 may comprise at least one metal selected from the group consisting of copper, nickel, and chromium, or an alloy thereof. For example, in one such embodiment, ionically permeable conductor layer 14 comprises porous copper, porous nickel, a porous alloy of copper or nickel, or a combination thereof. By way of further example, in one such embodiment, ionically permeable conductor layer 14 comprises porous copper or an alloy thereof such as porous copper silicide. By way of further example, in one such embodiment, ionically permeable conductor layer 14 comprises porous nickel or a porous alloy thereof such as porous nickel silicide. In each of the foregoing embodiments recited in this paragraph, the thickness of the ionically permeable conductor layer 14 (La, the shortest distance between anodically active material layer 12 and separator layer 16, as illustrated) will generally be at least about 0.1 micrometers, and typically in the range of about 0.1 to 10 micrometers. In each of the foregoing embodiments recited in this paragraph, the ionically permeable conductor layer 14 may be porous with a void fraction of in the range of about 0.25 to about 0.85 and, in certain embodiments, in the range of about 0.35 to about 0.65.

In one preferred embodiment, ionically permeable conductor layer 14 is formed by a process comprising a displacement plating step. In this embodiment, anodically active material layer 12 is silicon and the layer is contacted with a solution comprising ions of a metal and a dissolution component for dissolving part of the silicon. The silicon is dissolved, the metal in solution is reduced by electrons provided by the dissolution of the silicon, and the metal is deposited on the anodically active material layer, and annealing to form a metal-silicon alloy layer. The "dissolution component" refers to a constituent that promotes dissolution of the semiconductor material. Dissolution components include fluoride, chloride, peroxide, hydroxide, permanganate, etc. Preferred dissolution components are fluoride and hydroxide. Most preferred dissolution component is fluoride. The metal may be any of the aforementioned metals, with nickel and copper being preferred. Advantageously, the resulting layer will be porous, having a void fraction of about 0.15 to about 0.85. Additionally, the thickness of the resulting ionically permeable conductor layer can be controlled to be between about 100 nanometers and 3 micrometers; if desired, thicker layers can be formed.

Anodically active material layer 12 may comprise an anodically active material capable of absorbing and releasing a carrier ion such as lithium, potassium or sodium. Such materials include carbon materials such as graphite and carbides, or any of a range of metals, semi-metals, alloys, oxides and compounds capable of forming an alloy with lithium. Specific examples of the metals or semi-metals capable of constituting the anode material include tin, lead, magnesium, aluminum, boron, gallium, silicon, indium, zirconium, germanium, bismuth, cadmium, antimony, silver, zinc, arsenic, hafnium, yttrium, and palladium. In one exemplary embodiment, anodically active material layer 12 comprises aluminum, tin, or silicon, or an oxide thereof, a nitride thereof, a fluoride thereof, or other alloy thereof. In another exemplary embodiment, anodically active material layer 12 comprises silicon or an alloy thereof.

Figure 5:
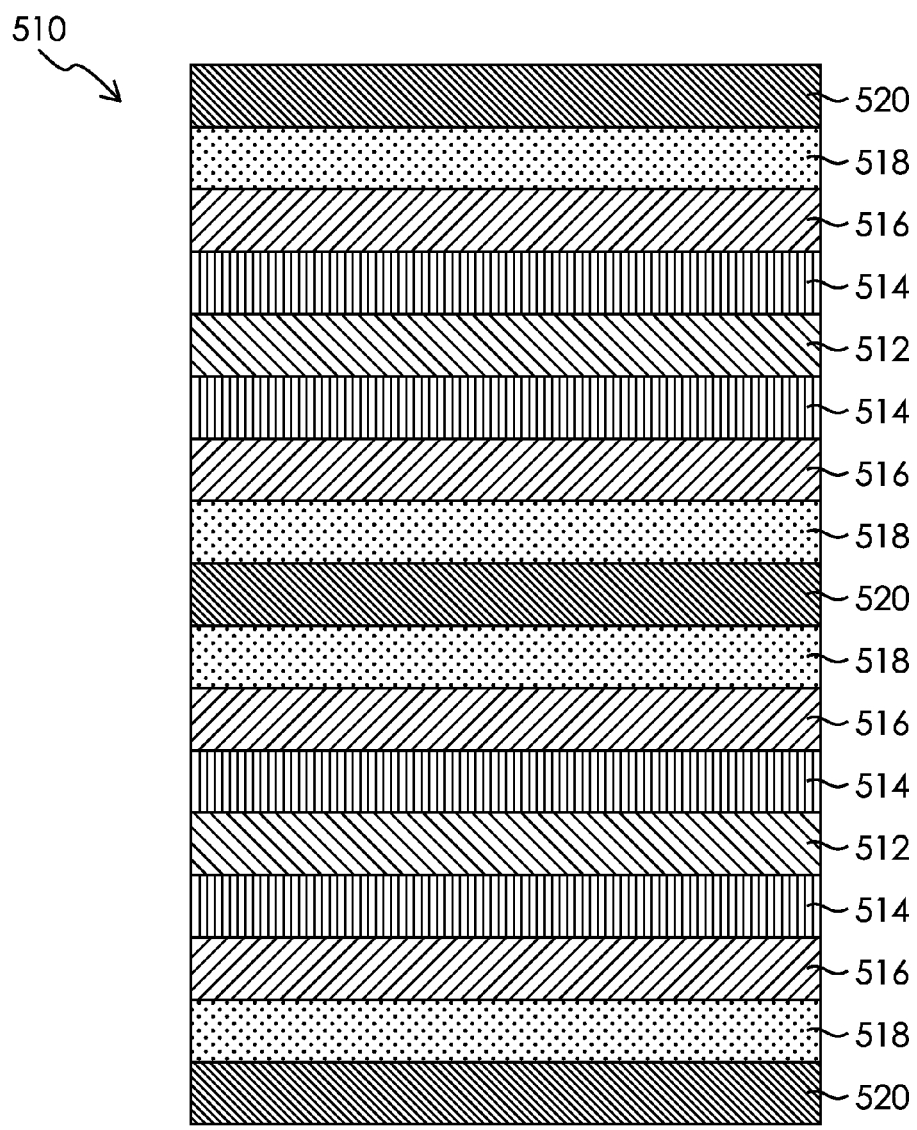
FIG. 5 is a schematic view of a 2-dimensional electrochemical stack of an energy storage device according to an alternative embodiment of the present invention.

Referring now to FIG. 5, in one embodiment an electrochemical stack 510 comprises electrochemical cathode current collector layers 520, cathode layers 518, separator layers 516, ionically permeable conductor layers 514 and anode layers 512 are arranged in a 2-dimensional format. Cathode current collector layers 520 are electrically connected to the cathode contact (not shown) and ionically permeable conductor layers 514 are electrically connected to the anode contact (not shown). For ease of illustration, only two anode layers 512 and only three cathode layers 518 are depicted in FIG. 5; in practice, however, an electrochemical stack will typically comprise an alternating series of anode and cathode layers, with the number of anode and cathode layers per stack depending upon the application.

Figure 6:
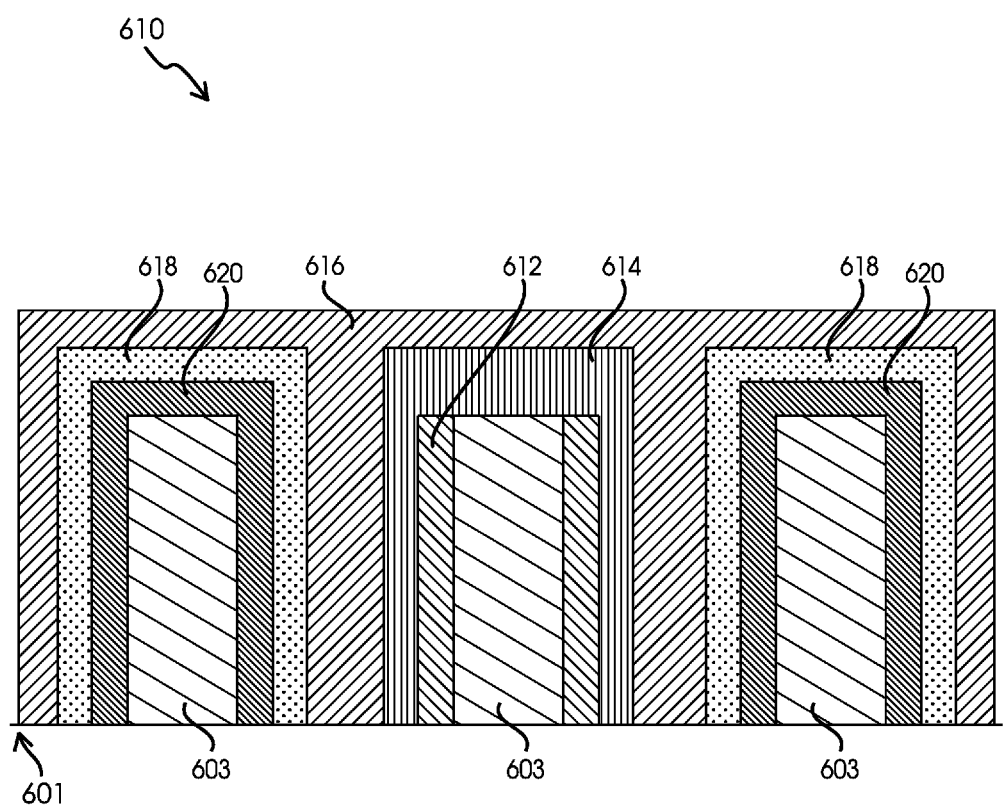
FIG. 6 is a schematic view of a 3-dimensional electrochemical stack of an energy storage device according to an alternative embodiment of the present invention.

Referring now to FIG. 6, in one embodiment an electrochemical stack 610 comprises reference plane 601 and backbones 603 projecting generally vertically from reference plane 601. The cathodic elements of electrochemical stack 610 comprise cathode current collector layers 620 and cathode active material layers 618. The anodic elements of electrochemical stack 610 comprise anodic active material layers 612 and ionically permeable conductor layer 614 which also serves as an anode current collector layer. Preferably, ionically permeable conductor layer 614 has a thickness at the top of backbone 603, i.e., the surface of backbone distal to reference plane 601, that is greater than the thickness of ionically permeable layer on the lateral sides of backbone 603 (the surfaces between the top and reference plane 601); for example, in one embodiment, the thickness at the top of the backbone is 110% to 2,000% of the thickness of the ionically permeable conductor on the lateral surfaces. By way of further example, in one embodiment the thickness at the top of the backbone is 200% to 1,000% of the thickness of the ionically permeable conductor on the lateral surfaces. Separator layer 616 is between ionically permeable conductor layer 614 and cathodically active material layers 618. Cathode current collector layers 620 are electrically connected to the cathode contact (not shown) and ionically permeable conductor layer 614 is electrically connected to the anode contact (not shown). For ease of illustration, only one anode backbone and only two cathode backbones are depicted in FIG. 6; in practice, however, an electrochemical stack will typically comprise an alternating series of anode and cathode backbones, with the number of per stack depending upon the application.

Backbones 603 provide mechanical stability for anodically active material layer 612 and cathodically active material layers 618. In general, the backbones will have a thickness (measured in a direction parallel to reference plane 601) of at least 1 micrometer but generally not in excess of 100 micrometers. For example, in one embodiment, backbones 603 will have a thickness of about 1 to about 50 micrometers. In general, backbones 603 will have a height (as measured in a direction perpendicular to reference plane 601) of at least about 50 micrometers, more typically at least about 100 micrometers. In general, however, backbones 603 will typically have a height of no more than about 10,000 micrometers, and more typically no more than about 5,000 micrometers. By way of example, in one embodiment, backbones 603 will have a thickness of about 5 to about 50 micrometers and a height of about 50 to about 5,000 micrometers. By way of further example, in one embodiment, backbones 603 will have a thickness of about 5 to about 20 micrometers and a height of about 100 to about 1,000 micrometers. By way of further example, in one embodiment, backbones 603 will have a thickness of about 5 to about 20 micrometers and a height of about 100 to about 2,000 micrometers.

Backbones 603 may comprise any material that may be shaped, such as metals, semiconductors, organics, ceramics, and glasses. Presently preferred materials include semiconductor materials such as silicon and germanium. Alternatively, however, carbon-based organic materials or metals, such as aluminum, copper, nickel, cobalt, titanium, and tungsten, may also be incorporated into anode backbone structures. In one exemplary embodiment, backbones 603 comprise silicon. The silicon, for example, may be single crystal silicon, polycrystalline silicon or amorphous silicon.

In one embodiment, anodically active material layers 612 are microstructured to provide a significant void volume fraction to accommodate volume expansion and contraction as lithium ions (or other carrier ions) are incorporated into or leave anodically active material layers 612 during charging and discharging processes. In general, the void volume fraction of the anodically active material layer is at least 0.1. Typically, however, the void volume fraction of the anodically active material layer is not greater than 0.8. For example, in one embodiment, the void volume fraction of the anodically active material layer is about 0.15 to about 0.75. By way of the further example, in one embodiment, the void volume fraction of the anodically active material layer is about 0.2 to about 0.7. By way of the further example, in one embodiment, the void volume fraction of the anodically active material layer is about 0.25 to about 0.6.

Depending upon the composition of the microstructured anodically active material layer and the method of its formation, the microstructured anodically active material layers may comprise macroporous, microporous or mesoporous material layers or a combination thereof such as a combination of microporous and mesoporous or a combination of mesoporous and macroporous. Microporous material is typically characterized by a pore dimension of less than 10 nm, a wall dimension of less than 10 nm, a pore depth of 1-50 micrometers, and a pore morphology that is generally characterized by a "spongy" and irregular appearance, walls that are not smooth and branched pores. Mesoporous material is typically characterized by a pore dimension of 10-50 nm, a wall dimension of 10-50 nm, a pore depth of 1-100 micrometers, and a pore morphology that is generally characterized by branched pores that are somewhat well defined or dendritic pores. Macroporous material is typically characterized by a pore dimension of greater than 50 nm, a wall dimension of greater than 50 nm, a pore depth of 1-500 micrometers, and a pore morphology that may be varied, straight, branched or dendritic, and smooth or rough-walled. Additionally, the void volume may comprise open or closed voids, or a combination thereof. In one embodiment, the void volume comprises open voids, that is, the anodically active material layer contains voids having openings at the surface of the anodically active material layer, the void openings facing the separator and the cathodically active material and through which lithium ions (or other carrier ions) can enter or leave the anodically active material layer; for example, lithium ions may enter the anodically active material layer through the void openings after leaving the cathodically active material and traveling to the anodically active material. In another embodiment, the void volume is closed, meaning that the anodically active material layer contains voids that are enclosed by anodically active material. In general, open voids can provide greater interfacial surface area for the carrier ions whereas closed voids tend to be less susceptible to solid electrolyte interface ("SEI") while each provides room for expansion of the anodically active material layer upon the entry of carrier ions. In certain embodiments, therefore, it is preferred that anodically active material layer comprise a combination of open and closed voids.

Anodically active material layers 612 comprise any of the anodically active materials previously described herein that are capable of absorbing and releasing a carrier ion such as lithium. Such materials include carbon materials such as graphite and carbides, or any of a range of metals, semimetals, alloys, oxides and compounds capable of forming an alloy with lithium. Specific examples of the metals or semimetals capable of constituting the anode material include tin, lead, magnesium, aluminum, boron, gallium, silicon, indium, zirconium, germanium, bismuth, cadmium, antimony, gold, silver, zinc, arsenic, hafnium, yttrium, and palladium. In one exemplary embodiment, anodically active material layers 612 comprise aluminum, tin, or silicon, or an oxide thereof, a nitride thereof, a fluoride thereof, or other alloy thereof. In another exemplary embodiment, anodically active material layers 612 comprise microstructured silicon or an alloy thereof. In one particularly preferred embodiment, anodically active material layers 612 comprise porous silicon or an alloy thereof, fibers (e.g., nanowires) of silicon or an alloy thereof, a combination of porous silicon or an alloy thereof and fibers (e.g., nanowires) of silicon or an alloy thereof, or other forms of microstructured silicon or an alloy thereof having a void volume fraction of at least 0.1. In each of the embodiments and examples recited in this paragraph and elsewhere in this patent application, the anodically active material layer may be monolithic or a particulate agglomerate.

In general, anodically active material layers 612 will have thicknesses (measured in a direction parallel to the surface of reference plane 601) of at least 1 micrometer. Typically, however, anodically active material layers 612 will each have a thickness that does not exceed 200 micrometers. For example, in one embodiment, anodically active material layers 612 will have a thickness of about 1 to about 100 micrometers. By way of further example, in one embodiment, anodically active material layers 612 will have a thickness of about 2 to about 75 micrometers. By way of further example, in one embodiment, anodically active material layers 612 have a thickness of about 10 to about 100 micrometers. By way of further example, in one embodiment, anodically active material layers 612 have a thickness of about 5 to about 50 micrometers. By way of further example, in one such embodiment, anodically active material layers 612 have a thickness of about 20 to about 50 micrometers and contain microstructured silicon and/or an alloy thereof such as nickel silicide. By way of further example, in one such embodiment, anodically active material layers 612 have a thickness of about 1 to about 100 micrometers and contain microstructured silicon and/or an alloy thereof such as nickel silicide.

Figure 7:
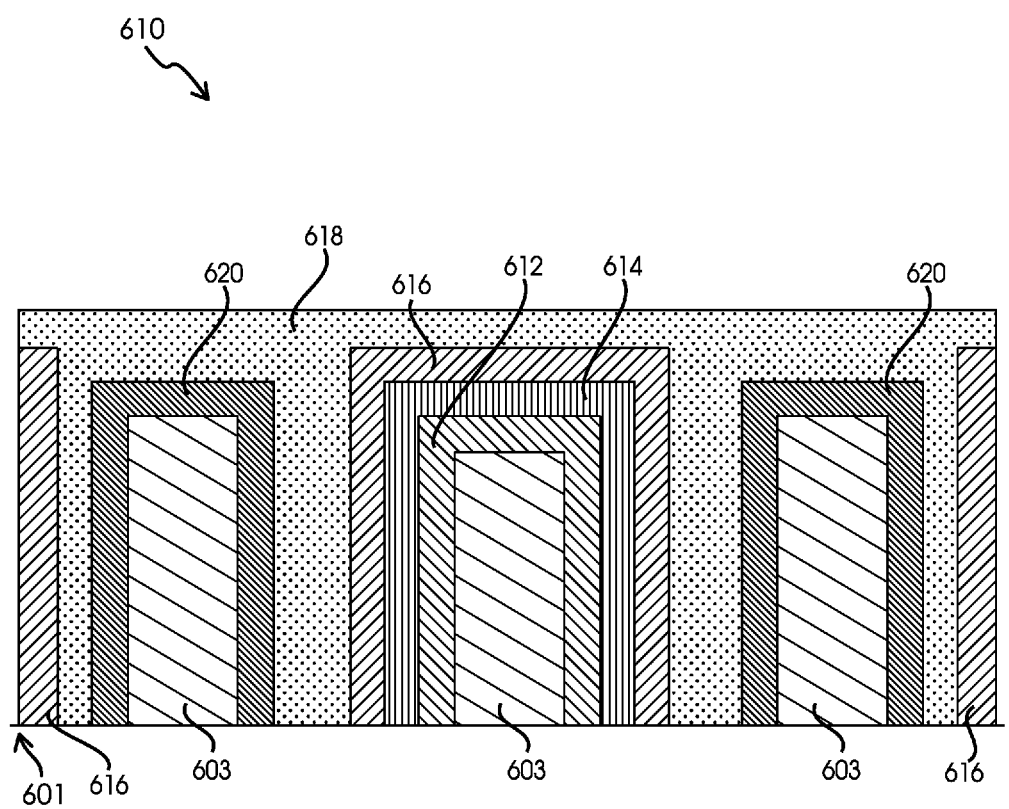
FIG. 7 is a schematic view of a 3-dimensional electrochemical stack of an energy storage device according to an alternative embodiment of the present invention.

Referring now to FIG. 7, in one embodiment an electrochemical stack 610 comprises reference plane 601 and backbones 603 projecting generally vertically from reference plane 601. The cathodic elements of electrochemical stack 610 comprise cathode current collector layers 620 and cathode active material layers 618. The anodic elements of electrochemical stack 610 comprise anodic active material layers 612 and ionically permeable conductor layer 614 which also serves as an anode current collector layer. Separator layer 616 is between ionically permeable conductor layer 614 and cathodically active material layers 618. In this embodiment, anodic active material layer 612 is on the top and lateral surfaces of backbone 603 and cathodic active material 618 is proximate the top and lateral surfaces of backbone 603. As a result, during charging and discharging of an energy storage device comprising electrochemical stack 610, carrier ions are simultaneously moving in two directions relative to reference plane 601: carrier ions are moving in a direction generally parallel to reference plane 601 (to enter or leave anodically active material 612 on the lateral surface of backbone 603) and in a direction generally orthogonal to the reference plane 601 (to enter or leave anodically active material 612 at the top surface of backbone 603). Cathode current collector layers 620 are electrically connected to the cathode contact (not shown) and ionically permeable conductor layer 614 is electrically connected to the anode contact (not shown). For ease of illustration, only one anode backbone and only two cathode backbones are depicted in FIG. 7; in practice, however, an electrochemical stack will typically comprise an alternating series of anode and cathode backbones, with the number per stack depending upon the application.

Figure 8:
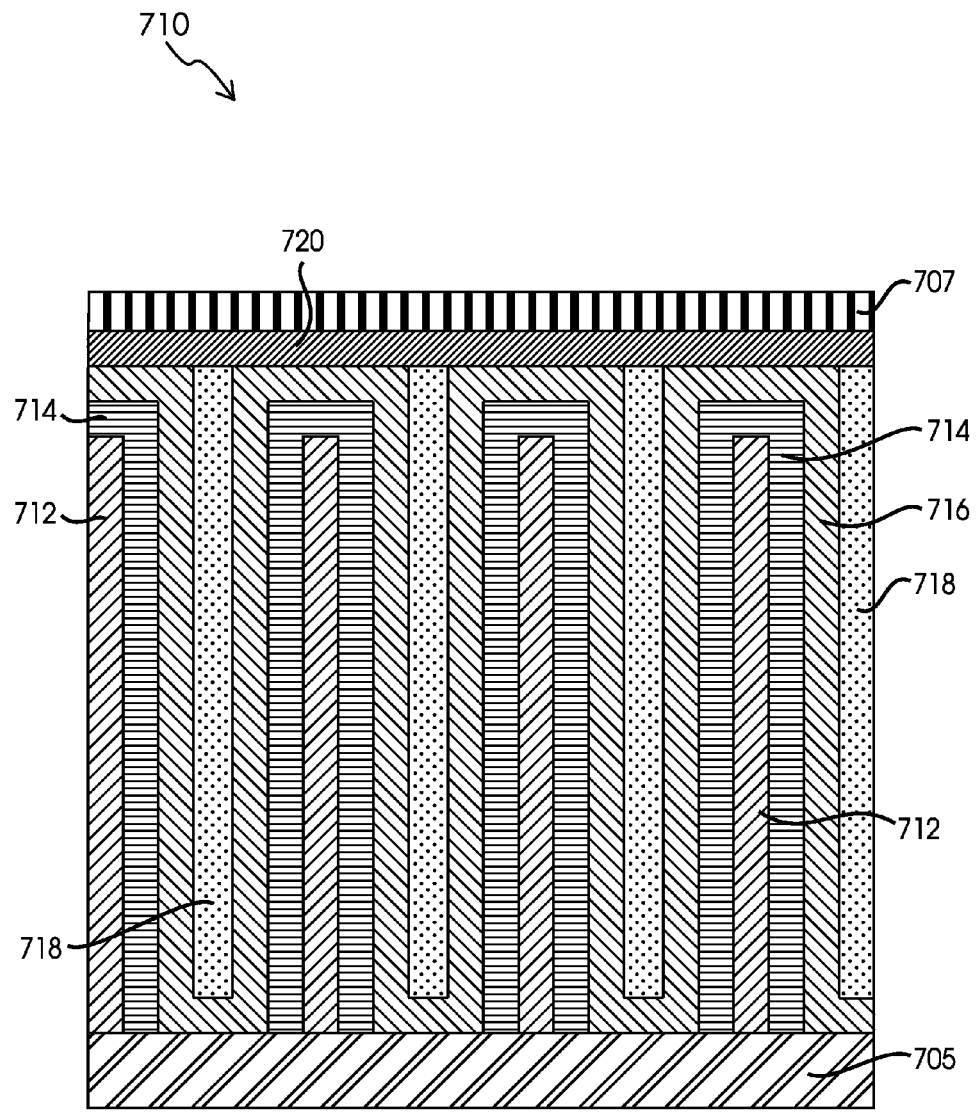
FIG. 8 is a schematic view of an interdigitated 3-dimensional electrochemical stack of an energy storage device according to an alternative embodiment of the present invention.

Referring now to FIG. 8, in one embodiment an electrochemical stack 710 comprises interdigitated anodically active material layers 712 and cathodically material layers 718. The cathodic elements of electrochemical stack 710 further comprise cathode current collector layer 720 and the anodic elements of the electrochemical stack comprise ionically permeable conductor layer 714 which functions as the anode current collector. Separator 716 is between ionically permeable conductor layer 714 and cathodically active material layer 718. Support layers 705, 707 provide mechanical support for interdigitated anodically active material layers 712. Although not shown in FIG. 8, in one embodiment, anodically active material layers 712 and cathodically active material layers 718 and may be supported by backbones, as illustrated in and described in connection with FIG. 6.

Some examples of other three-dimensional architectures that are capable of use with certain embodiments of the present invention are illustrated in FIGS. 9A-9E. Anode structures 24 and cathode structures 26 project from a reference plane, in this embodiment, the planar surface of base 22, and alternate in periodic fashion. For example, when anode structures 24 are in the shape of pillars (FIG. 9A), the microstructured anodically active material layer extends at least partially, and preferably fully about the circumference of the lateral surface. By way of further example, when anode structures 24 have two (or more) lateral surfaces as illustrated, for example, in FIGS. 9B-9E, the anodically active material layer at least partially covers, and preferably fully covers, at least one of the lateral surfaces. Additionally, each of the microstructured anodically active material layers in the population has a height (measured in a direction perpendicular to base 22) and the layers are disposed such that the distance between at least two of the layers of the population, e.g., layers 30A and 30B, measured in a direction that is substantially parallel to the planar surface of base 22 is greater than the maximum height of any of the layers in the population. For example, in one embodiment, the distance between at least two of the layers of the population, e.g., layers 30A and 30B, is greater than the maximum height of any of the layers in the population by a factor of at least 2, and in some embodiments substantially more, e.g., by a factor of at least 5 or even 10. By way of further example, in one embodiment, the distance between a majority of the layers of the population is greater than the maximum height of any of the layers in the population by a factor of at least 2, and in some embodiments substantially more, e.g., by a factor of at least 5 or even 10.

Figure 9A:
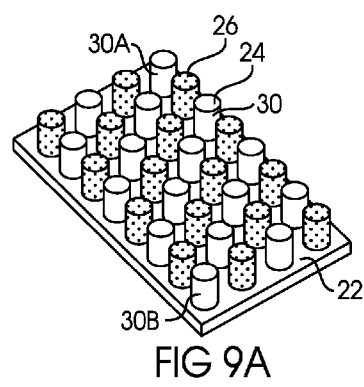
FIGS. 9A-9E are schematic illustrations of some shapes into which anode and cathode structures may be assembled according to certain embodiments of the present invention.

FIG. 9A shows a three-dimensional assembly with anode structures 24 and cathode structures 26 in the shape of pillars. Each of the pillars comprises a backbone having a lateral surface (not shown) projecting vertically from base 22. The lateral surface of each of the backbones supports an anodically active material layer 30 and the layers 30 are disposed such that the distance between at least two of the layers of the population, e.g., layers 30A and 30B, is greater than the maximum height of any of the layers in the population.

Figure 9B:
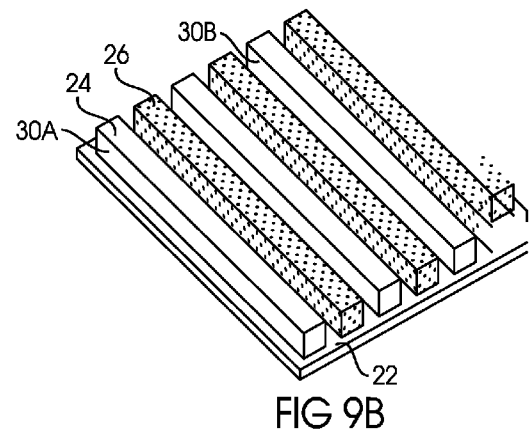

FIG. 9B shows a three-dimensional assembly with cathode structures 26 and anode structures 24 in the shape of plates. Each of the plates comprises a backbone having a lateral surface (not shown) projecting vertically from base 22. The lateral surface of each of the backbones supports an anodically active material layer 30 and the layers 30 are disposed such that the distance between at least two of the layers of the population, e.g., layers 30A and 30B, is greater than the maximum height of any of the layers in the population.

Figure 9C:
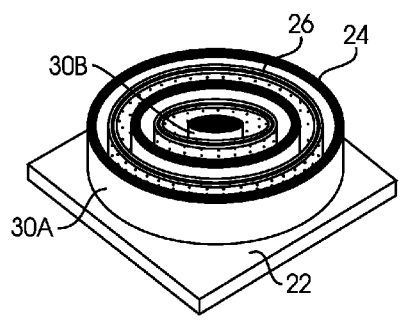

FIG. 9C shows a three-dimensional assembly with cathode structures 26 and anode structures 24 in the shape of concentric circles. Each of the concentric circles comprises a backbone having a lateral surface (not shown) projecting vertically from base 22. The lateral surface of each of the backbones supports an anodically active material layer 30 and the layers 30 are disposed such that the distance between at least two of the layers of the population, e.g., layers 30A and 30B, is greater than the maximum height of any of the layers in the population.

Figure 9D:
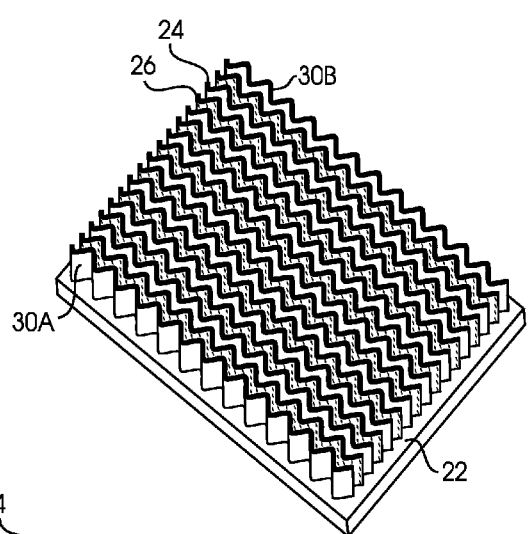

FIG. 9D shows a three-dimensional assembly with cathode structures 26 and anode structures 24 in the shape of waves.

Each of the waves comprises a backbone having a lateral surface (not shown) projecting vertically from base 22. The lateral surface of each of the backbones supports an anodically active material layer 30 and the layers 30 are disposed such that the distance between at least two of the layers of the population, e.g., layers 30A and 30B, is greater than the maximum height of any of the layers in the population.

Figure 9E:
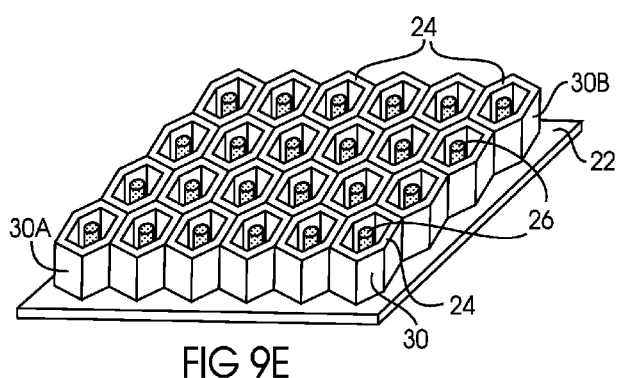

FIG. 9E shows a three-dimensional assembly with cathode structures 26 and anode structures 24 in a honeycomb pattern. The cathode structures 26 are in the shape of pillars at the center of each unit cell of the honeycomb structure and the walls of each unit cell of the honeycomb structure comprise an interconnected backbone network (system) having lateral surfaces (not shown) projecting vertically from base 22. The lateral surfaces of the backbone network (system) support anodically active material layers 30 and the layers 30 are disposed such that the distance between at least two of the layers of the population, e.g., layers 30A and 30B, is greater than the maximum height of any of the layers in the population. In an alternative embodiment, the three-dimensional assembly is a honeycomb structure, but the relative positions of the anode structures and cathode structures reversed relative to the embodiment depicted in FIG. 9E, i.e., in the alternative embodiment, the anode structures are in the shape of pillars (having lateral surfaces supporting anodically active material layers) and the walls of each unit cell comprise cathodically active material.

In one embodiment, a three-dimensional secondary battery comprises one or more three-dimensional electrochemical stacks, such as one of the three-dimensional architectures illustrated in FIGS. 6-8, a battery enclosure, and tabs for electrically connecting the electrochemical stacks to an external energy supply or consumer. For lithium ion batteries for portable electronics such as mobile phones and computers, for example, battery enclosure may be a pouch or other conventional battery enclosure.

The following non-limiting examples are provided to further illustrate the present invention.

EXAMPLES

Example 1

Formation of an IPC Layer on a Monolithic Anode

A Silicon substrate 500 μm thick is used as the starting material. The silicon substrate is cleaned and polished in 20% KOH solution at 65 C. for 3 minutes to clean the silicon surface. This sample is immersed in 500 milliliters of solution containing 0.1 M $NiSO_4.6H_2O$ and 5M $NH_4F$. The pH of the solution was maintained at 8.5 and the operating temperature was 85 C. The deposition time of the sample was 3 minutes. The sample was subsequently rinsed in DI water for 5 minutes and dried at 80 C. in air. Subsequently, the sample was annealed to a temperature of 550° C. for 20 minutes (including heating and cooling time) to form the silicide containing IPC layer.

Example 1A

Formation of an IPC Layer on a Monolithic Anode

A Silicon substrate 500 μm thick is used as the starting material. The silicon substrate is cleaned and polished in 20% KOH solution at 65 C. for 3 minutes to clean the silicon surface. This sample is immersed in 500 milliliters of solution containing 0.1 M $NiSO_4.6H_2O$ and 5M $NH_4F$. The pH of the solution was maintained at 8.5 and the operating temperature was 85° C. The deposition time of the sample was 3 minutes. The sample was subsequently rinsed in DI water for 5 minutes and dried at 80° C. in air. Subsequently, the sample was annealed to a temperature of 550° C. for 20 minutes (including heating and cooling time) to form the silicide containing IPC layer. The excess Ni that did not form the silicide was selectively etched using a solution of 10% $H_2O_2$ and 10% $H_2SO_4$ for 10 minutes at 75° C.

Example 1B

Formation of an IPC Layer on a Monolithic Anode

A Silicon substrate 500 μm thick is used as the starting material. The silicon substrate is cleaned and polished in 20% KOH solution at 65° C. for 3 minutes to clean the silicon surface. This sample is immersed in 500 milliliters of solution containing 0.1 M $NiSO_4.6H_2O$ and 5M $NH_4F$. The pH of the solution was maintained at 8.5 and the operating temperature was 85° C. The deposition time of the sample was 3 minutes. The sample was subsequently rinsed in DI water for 5 minutes and dried at 80° C. in air. Subsequently, the sample was annealed to a temperature of 300° C. for 5 minutes (including heating and cooling time) to improve the adhesion of deposited Ni to silicon. Since the deposit was based on a displacement nickel deposition, the Ni layer was porous and was able to allow the Lithium transport when assembled as an anode in a lithium battery.

Example 2

Formation of Battery with the IPC Layer from Example 1

The silicon substrate with the Ni+NiSi IPC layer from Example 1 was to be used as the anode material in the lithium ion battery. An overhanging edge of the silicon piece was wirebonded with Cu wire in order to provide the means for electrical connection to the outside of the battery package, commonly referred to as the tab. The wirebonding in this case was done on either side of the anode surface; however, it is possible to collect the current from one side alone if the IPC layer is coated on the sides of the anode piece as well. This wirebonded Si piece was wrapped with a 25 μm thick separator over the sample, and a conventional single sided coated and calendared cathode foil was used on either side of the anode/separator combination. Each cathode foil was tabbed using an aluminum tab. The assembly was then covered with a conventional lithium battery pouch material, filled with electrolyte, and sealed with the tab connections from the cathode and anode protruding through the seal to form the positive and negative electrode connections for charge/discharge of the battery.

Example 3

Formation of Battery with the IPC Layer from Example 1

The silicon substrate with the Ni+NiSi IPC layer from Example 1 was to be used as the anode material in the lithium ion battery. A copper mesh 25 μm thick was dipped in a solution of 2 wt % PVDF and 4 wt % carbon black. One mesh was laid over each surface of the anode, pressed, and heated to 120° C. for 10 min in a pressed state to form an electrical connection between the mesh and the porous Ni layer above the anode from Example 1. The overhangs of the mesh were cut off using a mesh cutter on three sides while leaving one side overhanging. This mesh was then welded to a Ni tab, which served as the connection to the environment outside of the device. The anode+IPC current collector was wrapped with a 25 μm thick separator over the sample, and a conventional single sided coated and calendared cathode foil was used on either side of the anode/separator combination. Each cathode foil was tabbed using an aluminum tab. The assembly was then covered with a conventional lithium battery pouch material, filled with electrolyte, and sealed with the tab connections from the cathode and anode protruding through the seal to form the positive and negative electrode connections for charge/discharge of the battery.

Example 4

Formation of an IPC Layer on a Particulate Anode and Particulate Cathode

A 10 μm thick mylar foil was used as a substrate. A solution of MCMB graphite particles (10 μm average particle size), carbon black, and polyvinylidene difluoride (PVDF) with a ratio of 90:5:5 by weight were mixed in n-Methyl Pyrollidone to form a slurry. This slurry was coated on the Mylar foil and dried with forced convection before sending through a 20 ton calendar roll to a target thickness of 120 μm. A similar process was used with $LiCoO_2$, graphite, carbon black, and polyvinylidene difluoride (PVDF) in a ratio of 90:2.5:2.5:5 by weight. This slurry was coated on the Mylar foil and dried with forced convection before sending through a 20 ton calendar roll to a target thickness of 100 μm. A copper mesh 25 μm thick was dipped in a solution of 2 wt % PVDF and 4 wt % carbon black. The mesh was laid over the surface of the anode, pressed, and heated to 120° C. for 10 min in a pressed state to form an electrical connection between the mesh and the anode material coated Mylar film. The overhangs of the mesh were cut off using a mesh cutter on three sides while leaving one side overhanging. This mesh was then welded to a Ni tab, which served as the connection to the environment outside of the device. An aluminum mesh 20 μm thick was dipped in a solution of 2 wt % PVDF and 4 wt % carbon black. The mesh was laid over the surface of the cathode, pressed, and heated to 120° C. for 10 min in a pressed state to form an electrical connection between the mesh and the cathode material coated Mylar film. The overhangs of the mesh were cut off using a mesh cutter on three sides while leaving one side overhanging. This mesh was then welded to a Al tab, which served as the connection to the environment outside of the device. The anode+ IPC, and the cathode+ IPC layers were assembled together with a 25 μm polyolefin separator material in between to act as the separator. The assembly was then covered with a conventional lithium battery pouch material, filled with electrolyte, and sealed with the tab connections from the cathode and anode protruding through the seal to form the positive and negative electrode connections for charge/discharge of the battery.

Example 5

Formation of an IPC Layer on a Particulate Anode

A 10 μm thick mylar foil was used as a substrate. A solution of MCMB graphite particles (10 μm average particle size), carbon black, and polyvinylidene difluoride (PVDF) with a ratio of 90:5:5 by weight were mixed in n-Methyl Pyrollidone to form a slurry. This slurry was coated on the Mylar foil and dried with forced convection before sending through a 20 ton calendar roll to a target thickness of 120 μm. A similar process was used with $LiCoO_2$, graphite, carbon black, and polyvinylidene difluoride (PVDF) in a ratio of 90:2.5:2.5:5 by weight. This slurry was coated on the Mylar foil and dried with forced convection before sending through a 20 ton calendar roll to a target thickness of 100 μm. A slurry consisting of 90% by weight copper particles, 2-5 μm in diameter, 8% Graphite, and 2% PVDF in NMP was coated on top of the anode and dried using forced convection methods. The resultant film was again sent through a 20 ton calendar roll to achieve a target thickness of 130 μm, which accounts for 10 μm thickness of the IPC layer. A nickel tab was attached to one of the edges of the electrode with a graphite based conductive epoxy to provide electrical connections to the environment outside of the device. This anode+ IPC layer was assembled together with a 25 μm polyolefin separator material in between to act as the separator, and a conventional cathode material with an Aluminum tab connection. The assembly was then covered with a conventional lithium battery pouch material, filled with electrolyte, and sealed with the tab connections from the cathode and anode protruding through the seal to form the positive and negative electrode connections for charge/discharge of the battery.

Example 6

Formation of a Sintered Particulate Electrode with IPC Layer

A sample of 2 grams of silicon particulates in powder form (−325 mesh) was immersed for 30 seconds in 50 milliliters of a solution 0.1 M $NiSO_4.6H_2O$ and 5M $NH_4F$. The pH of the solution was maintained at 8.5 and the operating temperature was 85° C. Deposition was done with the powder on top of a filter paper assembled in a Buchner funnel. Vigorous bubbles were observed during deposition indicating the nickel displacement reaction. The solution was drained out through the application of vacuum in the Buchner funnel. The sample was rinsed with DI water for 10 minutes to remove trace salt contamination. The powder was harvested and dried at 80° C. in air for 12 hours. Separately, a 25 μm thick nickel mesh was hot-pressed to a Mylar foil at 150° C. so that approximately 5-10 μm of the 25 μm mesh was embedded into the Mylar foil. The displacement nickel coated particles are dispersed in an aqueous solution containing carboxymethylcellulose and coated onto the mesh/mylar substrate. The coated mesh is dried to remove water. Once dry, the Mylar film is peeled from the back end, leaving the mesh and coated anode slurry behind. This mixture is heated to 850° C. in an argon atmosphere to sinter the nickel silicide coated particles to each other and to the nickel mesh. The resultant sintered electrode is then used as the anode material with the nickel mesh surface having been assembled closest to the separator interface.

Example 7

Ion-Conductive Layer+Patterned Metal as IPC

A 25 μm thick Mylar foil was used as a substrate, on top of which a 1 μm thick film of amorphous silicon anode material was sputter deposited. The sample was then coated with a 10 μm thick photoresist, which was subsequently line-patterned with a landing pad. This sample was then deposited with 2 μm of copper both in the trenches and on the photoresist to form a full film. Subsequently, the resist was stripped in hot NMP solution to remove and undercut the Cu metal on top of the photoresist pattern leaving behind the line patterned sample. The sample was then sputter deposited with a 0.25 µm thick film of Lithium phosphorus oxynitride (LIPON) by sputter coating from a lithium phosphate target in the presence of nitrogen. This combination was used as an anode in a lithium-ion battery.

In view of the above, it will be seen that the several objects of the invention are achieved and other advantageous results attained.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above articles, compositions and methods without departing from the scope of the invention, it is intended that all matter contained in the above description and shown in the accompanying drawings shall be interpreted as illustrative and not in a limiting sense.

What is claimed is:

1. An electrochemical stack comprising carrier ions, an anode comprising an anode active material layer, a cathode comprising a cathode active material layer, a separator between the anode and the cathode comprising a porous dielectric material and a non-aqueous electrolyte, and an ionically permeable conductor layer located between and in direct contact with each of the separator and an electrode active material layer, the electrode active material being the anode active material layer or the cathode active material layer wherein upon application of a current to store energy in the electrochemical stack or an applied load to discharge the electrochemical stack: (i) the carrier ions travel between the anode and cathode active material layers and through the ionically permeable conductor layer and separator as they travel between the anode active and cathode active material layers, (ii) the anode active material layer, the cathode active material layer, and the ionically permeable conductor layer each have an electrical conductance, (iii) the anode active material layer, the cathode active material layer, the ionically permeable conductor layer and the separator each have an ionic conductance for the carrier ions, (iv) the ratio of the ionic conductance of the ionically permeable conductor layer to the ionic conductance of the separator is at least 0.5:1, (v) the ratio of the electrical conductance of the ionically permeable conductor layer to the electrical conductance of the electrode active material layer is at least 100:1, and (vi) the ratio of the electrical conductance to the ionic conductance of the ionically permeable conductor layer is at least 1,000:1 wherein the anode comprises a backbone projecting vertically from a reference plane, the backbone has a top surface that parallels the reference plane and a lateral surface that is perpendicular to the reference plane, a first portion of the ionically permeable conductor layer covers the top surface of the backbone, a second portion of the ionically permeable conductor layer covers the lateral surface of the backbone, and the thickness of the first portion is 200% to 1,000% of the thickness of the second portion of the ionically permeable conductor layer.

2. The electrochemical stack of claim 1 wherein the ionically permeable conductor layer is between the separator and the anode active material layer.

3. The electrochemical stack of claim 1 wherein the ionically permeable conductor layer is between the separator and the cathode active material layer.

4. The electrochemical stack of claim 1 wherein the electrochemical stack comprises two ionically permeable conductor layers, one of the ionically permeable conductor layers is between the separator and the anode, and the other of the ionically permeable conductor layers is between the separator and the cathode.

5. The electrochemical stack of claim 1 wherein the anode comprises an anode current collector, the cathode comprises a cathode current collector, and the ionically permeable conductor layer comprises the anode current collector.

6. The electrochemical stack of claim 1 wherein the anode comprises an anode current collector, the cathode comprises a cathode current collector, and the ionically permeable conductor layer comprises the cathode current collector.

7. The electrochemical stack of claim 1 wherein the anode comprises an anode current collector, the cathode comprises a cathode current collector, and the electrochemical stack comprises two ionically permeable conductor layers, one of the ionically permeable conductor layers being between the separator and the anode active material and comprising the anode current collector and the other of the ionically permeable conductor layers being between the separator and the cathode active material and comprising the cathode current collector.

8. The electrochemical stack of claim 1 wherein the ionically permeable conductor layer comprises a porous material and the non-aqueous electrolyte, and the porous material is selected from the group consisting of porous metals and porous metal alloys.

9. The electrochemical stack of claim 1 wherein the ionically permeable conductor layer comprises a mesh or conductive lines, the mesh or conductive lines comprising a metal or alloy thereof.

10. The electrochemical stack of claim 1 wherein the ionically permeable conductor layer comprises a solid ion conductor.

11. The electrochemical stack of claim 1 wherein the ionically permeable conductor layer comprises porous copper, porous nickel, a porous alloy of copper or nickel, or a combination thereof having a void fraction in the range of about 0.25 to about 0.85 and a thickness in the range of about 300 Angstroms to about 3 micrometers.

12. The electrochemical stack of claim 1 wherein the anodically active material layer comprises silicon or an alloy thereof.

13. The electrochemical stack of claim 12 wherein the silicon is microstructured silicon having a void volume fraction of about 0.15 to about 0.75.

14. A secondary battery comprising the electrochemical stack of claim 1.

15. The electrochemical stack of claim 1 wherein the ionically permeable conductor layer has a thickness in the range of about 0.1 to about 5 micrometers.

16. The electrochemical stack of claim 1 wherein the ionically permeable conductor layer has a thickness in the range of about 0.5 to about 3 micrometers.

17. The electrochemical stack of claim 1 wherein the ionically permeable conductor layer has a thickness non-uniformity of less than about 25% wherein thickness non-uniformity is defined as the quantity of the maximum thickness of the layer minus the minimum thickness of the layer, divided by the average layer thickness.

18. The electrochemical stack of claim 1 wherein the ionically permeable conductor layer has a thickness non-uniformity of less than about 10% wherein thickness non-uniformity is defined as the quantity of the maximum thickness of the layer minus the minimum thickness of the layer, divided by the average layer thickness.

19. The electrochemical stack of claim 1 wherein the ionically permeable conductor layer has a void volume fraction of at least about 0.25.

20. The electrochemical stack of claim 1 wherein the ionically permeable conductor layer has a void volume fraction of about 0.35 to about 0.65.

21. The electrochemical stack of claim 1 wherein the electrolyte comprises carrier ions, the ionically permeable conductor layer and the separator layer each have an ionic conductance for the carrier ions, and the ratio of the ionic conductance of the ionically permeable conductor layer to the ionic conductance of the separator layer for the carrier ions is at least 1.25:1, respectively, upon application of a current to store energy in the device or an applied load to discharge the device.

22. The electrochemical stack of claim 21 wherein the electrode active material layer is the anode active material layer, the anode active material layer and the ionically permeable conductor layer each have an electrical conductance upon application of a current to store energy in the device or an applied load to discharge the device, and the ratio of the electrical conductance of the ionically permeable conductor layer to the electrical conductance of anodically active material layer is at least 1,000:1.

23. The electrochemical stack of claim 21 wherein the electrode active material layer is the anode active material layer, the anode active material layer and the ionically permeable conductor layer each have an electrical conductance upon application of a current to store energy in the device or an applied load to discharge the device, and the ratio of the electrical conductance of the ionically permeable conductor layer to the electrical conductance of anodically active material layer is at least 5:000:1.

24. The electrochemical stack of claim 21 wherein the electrode active material layer is the anode active material layer, the anode active material layer and the ionically permeable conductor layer each have an electrical conductance upon application of a current to store energy in the device or an applied load to discharge the device, and the ratio of the electrical conductance of the ionically permeable conductor layer to the electrical conductance of anodically active material layer is at least 10,000:1.

25. The electrochemical stack of claim 1 wherein the electrolyte comprises carrier ions, the ionically permeable conductor layer and the separator layer each have an ionic conductance for the carrier ions, and the ratio of the ionic conductance of the ionically permeable conductor layer to the ionic conductance of the separator layer for the carrier ions is at least 1.5:1, respectively, upon application of a current to store energy in the device or an applied load to discharge the device.

26. The electrochemical stack of claim 25 wherein the electrode active material layer is the anode active material layer, the anode active material layer and the ionically permeable conductor layer each have an electrical conductance upon application of a current to store energy in the device or an applied load to discharge the device, and the ratio of the electrical conductance of the ionically permeable conductor layer to the electrical conductance of anodically active material layer is at least 1,000:1.

27. The electrochemical stack of claim 25 wherein the electrode active material layer is the anode active material layer, the anode active material layer and the ionically permeable conductor layer each have an electrical conductance upon application of a current to store energy in the device or an applied load to discharge the device, and the ratio of the electrical conductance of the ionically permeable conductor layer to the electrical conductance of anodically active material layer is at least 5:000:1.

28. The electrochemical stack of claim 25 wherein the electrode active material layer is the anode active material layer, the anode active material layer and the ionically permeable conductor layer each have an electrical conductance upon application of a current to store energy in the device or an applied load to discharge the device, and the ratio of the electrical conductance of the ionically permeable conductor layer to the electrical conductance of anodically active material layer is at least 10,000:1.

* * * * *